(12) United States Patent
Ogasawara

(10) Patent No.: US 7,945,154 B2
(45) Date of Patent: May 17, 2011

(54) INFORMATION COMMUNICATION DEVICE AND EXTERNAL DEVICE

(75) Inventor: Akira Ogasawara, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/382,553

(22) Filed: Mar. 18, 2009

(65) Prior Publication Data

US 2009/0185797 A1   Jul. 23, 2009

Related U.S. Application Data

(63) Continuation of application No. PCT/JP2007/070469, filed on Oct. 19, 2007.

(30) Foreign Application Priority Data

Oct. 19, 2006   (JP) ................................ 2006-285144

(51) Int. Cl.
*G03B 15/03* (2006.01)
(52) U.S. Cl. .................... 396/157; 396/198; 396/322
(58) Field of Classification Search ............. 396/56, 396/59, 180, 189, 187, 364, 332, 333; 348/370–371
See application file for complete search history.

(56) References Cited

U.S. PATENT DOCUMENTS

| 5,706,120 A | * | 1/1998 | O'Brien et al. ............... 359/230 |
| 2002/0009296 A1 | * | 1/2002 | Shaper et al. ................... 396/56 |
| 2002/0127019 A1 | | 9/2002 | Ogasawara |
| 2003/0175025 A1 | | 9/2003 | Watanabe et al. |
| 2004/0101295 A1 | * | 5/2004 | Clark ............................... 396/56 |
| 2004/0151487 A1 | * | 8/2004 | Iwasaki et al. ................ 396/182 |
| 2004/0240868 A1 | * | 12/2004 | Iwasaki ........................... 396/56 |

FOREIGN PATENT DOCUMENTS

| JP | A-5-232550 | | 9/1993 |
| JP | 06194725 A | * | 7/1994 |
| JP | A-6-267682 | | 9/1994 |
| JP | A-9-93179 | | 4/1997 |
| JP | A-2000-89306 | | 3/2000 |
| JP | B2-3262874 | | 3/2002 |
| JP | A-2002-318413 | | 10/2002 |
| JP | A-2004-40185 | | 2/2004 |
| JP | A-2005-236532 | | 9/2005 |
| JP | A-2006-108730 | | 4/2006 |

* cited by examiner

*Primary Examiner* — Clayton E Laballe
*Assistant Examiner* — Leon W Rhodes
(74) *Attorney, Agent, or Firm* — Oliff & Berridge, PLC

(57) ABSTRACT

An information communication device includes: a packet generation unit that generates a packet including timing data at an end of the packet for specifying to an external device a start timing for processing related to photography; a transmitting unit that transmits the packet to the external device by wireless communication; and a transmission control unit that changes a state of packet transmission by the transmission unit according to a start timing of the processing related to photography.

28 Claims, 20 Drawing Sheets

FIG.7A

| 5a | 5b | 5c | 5e | 5f | 5g | 5f | 5g | 5h | 5i |
|---|---|---|---|---|---|---|---|---|---|
| PREAMBLE | SFD | FRAME LENGTH | LIGHT EMISSION COMMAND | OPPOSITE PARTY ID = 1 | PARAMETER = AMOUNT OF EMITTED LIGHT | OPPOSITE PARTY ID = 2 | PARAMETER = AMOUNT OF EMITTED LIGHT | CHECK DATA | FIXED DATA |

(5d spans from 5e through 5g)

FIG.7B

| 5a | 5b | 5c | 5e | 5f | 5g | 5h | 5i |
|---|---|---|---|---|---|---|---|
| PREAMBLE | SFD | FRAME LENGTH | LIGHT EMISSION COMMAND | OPPOSITE PARTY ID = 0 | PARAMETER = AMOUNT OF EMITTED LIGHT | CHECK DATA | FIXED DATA |

(5d spans 5e–5g)

FIG.7C

| 5a | 5b | 5c | 5e | 5f | 5g | 5h | 5i |
|---|---|---|---|---|---|---|---|
| PREAMBLE | SFD | FRAME LENGTH | LIGHT EMISSION COMMAND | OPPOSITE PARTY ID = 0 | PARAMETER = TIME PERIOD FOR LIGHT EMISSION TO BE CONTINUED | CHECK DATA | FIXED DATA |

(5d spans 5e–5g)

FIG.7D

| 5a | 5b | 5c | 5e | 5f | 5g | 5h | 5i |
|---|---|---|---|---|---|---|---|
| PREAMBLE | SFD | FRAME LENGTH | PRELIMINARY LIGHT EMISSION COMMAND | OPPOSITE PARTY ID = 1 | PARAMETER = AMOUNT OF EMITTED LIGHT | CHECK DATA | FIXED DATA |

(5d spans 5e–5g)

FIG.16A

| 5 b | 5 c | 5 e | 5 f | 5 g | 5 h |
|---|---|---|---|---|---|
| SFD | FRAME LENGTH | LIGHT EMISSION GAIN COMMAND | OPPOSITE PARTY ID = 0 | PARAMETER = AMOUNT OF EMITTED LIGHT | CHECK DATA |

(5a PREAMBLE; 5d spans 5e–5h)

FIG.16B

| 5 b | 5 c | 5 e | 5 f | 5 g | 5 g | 5 h |
|---|---|---|---|---|---|---|
| SFD | FRAME LENGTH | LIGHT EMISSION GAIN COMMAND | OPPOSITE PARTY ID = 0 | PARAMETER = AMOUNT OF EMITTED LIGHT | PARAMETER = TIME PERIOD FOR LIGHT EMISSION TO BE CONTINUED | CHECK DATA |

(5a PREAMBLE; 5d spans 5e–5h)

FIG.16C

| 5 b | 5 c | 5 e | 5 f | 5 h | 5 i |
|---|---|---|---|---|---|
| SFD | FRAME LENGTH | LIGHT EMISSION COMMAND | OPPOSITE PARTY ID = 0 | CHECK DATA | FIXED DATA |

(5a PREAMBLE; 5d spans 5e–5h)

FIG.16D

| 5 b | 5 c | 5 e | 5 f | 5 h |
|---|---|---|---|---|
| SFD | FRAME LENGTH | LIGHT EMISSION COMMAND | OPPOSITE PARTY ID = 0 | CHECK DATA |

(5a PREAMBLE; 5d spans 5e–5h)

INFORMATION COMMUNICATION DEVICE AND EXTERNAL DEVICE

This application is a continuation of International Application No. PCT/JP2007/070469 filed Oct. 19, 2007.

INCORPORATION BY REFERENCE

The disclosures of the following priority application and International Application are herein incorporated by reference: Japanese Patent Application No. 2006-285144, filed Oct. 19, 2006; and International Application No. PCT/JP2007/070469, filed Oct. 19, 2007.

BACKGROUND OF THE INVENTION

1. Field of the Invention

The present invention relates to a camera for photographing images, and to an external device that is connected to the camera.

2. Description of Related Art

A wireless light supplementation system of the following type is, for example, known from Patent Reference #1. With this system, an auxiliary electronic flash unit detects light emission by a main electronic flash unit that is connected to the camera, and starts its own light emission (refer to Japanese Laid-Open Patent Publication H06-267682).

SUMMARY OF THE INVENTION

However, with such a prior art system, it has been difficult to make the light emission timings of the main electronic flash unit on the camera side and of the auxiliary electronic flash unit, that is an external device, agree with one another, since measurement by a timer is started from when the auxiliary electronic flash unit detects the light emission of the main electronic flash unit, for determining the starting timing of its own light emission.

According to the 1st aspect of the present invention, an information communication device comprises: a packet generation unit that generates a packet including timing data at an end of the packet for specifying to an external device a start timing for processing related to photography; a transmitting unit that transmits the packet to the external device by wireless communication; and a transmission control unit that changes a state of packet transmission by the transmission unit according to a start timing of the processing related to photography.

According to the 2nd aspect of the present invention, in the information communication device according to the 1st aspect, it is preferred that the transmission control unit changes the state of packet transmission by stopping a transmission of the timing data according to the start timing of the processing related to photography.

According to the 3rd aspect of the present invention, in the information communication device according to the 1st aspect, it is preferred that the transmission control unit changes the state of packet transmission by changing a data pattern of the timing data according to the start timing of the processing related to photography.

According to the 4th aspect of the present invention, in the information communication device according to the 1st aspect, it is preferred that the packet generation unit generates the packet while including, before the timing data, command data for commanding the external device to execute the processing related to photography.

According to the 5th aspect of the present invention, in the information communication device according to the 4th aspect, it is preferred that: the external device is an electronic flash unit; and the command data is data for commanding the electronic flash unit to perform emission of light.

According to the 6th aspect of the present invention, in the information communication device according to the 5th aspect, it is preferred that: the information communication device is a camera; and the packet generation unit generates a packet that includes, before the timing data, data that specifies a time period over which a shutter of the camera is fully opened.

According to the 7th aspect of the present invention, in the information communication device according to the 1st aspect, it is preferred that: the information communication device is a camera; the external device is an electronic flash unit; if a mode of the camera is set to a rear curtain sync mode in which the electronic flash unit is caused to emit light directly before a travel of a rear curtain of the shutter, the packet generation unit generates a light emission command packet that specifies a first light emission command without including the timing data; and the transmission control unit causes the transmitting unit to transmit the light emission command packet, before the travel of the rear curtain of the shutter.

According to the 8th aspect of the present invention, in the information communication device according to the 1st aspect, it is preferred that: the external device is an electronic flash unit; and the transmission control unit changes a packet transmission start timing, according to the light emission mode in which the electronic flash unit is caused to perform emission of light.

According to the 9th aspect of the present invention, in the information communication device according to the 4th aspect, it is preferred that the packet generation unit generates a packet that includes check data, after the command data and before the timing data, for checking data included in the packet.

According to the 10th aspect of the present invention, in the information communication device according to the 1st aspect, it is preferred that: the information communication device is a camera; the external device is an electronic flash unit; the start timing of the processing related to photography is a timing at which the camera starts photometry, and a timing of a start of a preliminary emission of light that the electronic flash unit performs before a main emission of light; and there is further provided a processing execution unit that starts photometry at the start timing of the processing related to photography.

According to the 11th aspect of the present invention, in the information communication device according to the 1st aspect, it is preferred that: the information communication device is a camera; the external device is an external camera that is connected by wireless to the camera; a timing of processing related to photography is a timing at which a shutter of the camera is opened, and a timing at which a shutter of the external camera is opened; and there is further provided a processing execution unit that opens the shutter at the start timing of the processing related to photography.

According to the 12th aspect of the present invention, in the information communication device according to the 1st aspect, it is preferred that if a plurality of the external devices are present, the packet generation unit generates a packet including, before the timing data, information for specifying any one of the external devices individually, or information for specifying all of the external devices together.

According to the 13th aspect of the present invention, in the information communication device according to the 1st aspect, it is preferred that if a plurality of the external devices are present, the packet generation unit generates a packet including, before the timing data, control information for controlling each of the external devices individually within the packet.

According to the 14th aspect of the present invention, in the information communication device according to the 1st aspect, it is preferred that: the external device is an electronic flash unit; and there is further provided a request unit that requests the electronic flash unit to transmit a packet including information that specifies a state of affairs during light emission.

According to the 15th aspect of the present invention, in the information communication device according to the 14th aspect, it is preferred that the information that specifies the state of affairs during light emission is at least one of information that specifies that the electronic flash unit has performed full light emission, and information related to a difference between a target amount of light during light emission and an actual amount of light emitted.

According to the 16th aspect of the present invention, an external device that is connected by wireless to an information communication device including a packet generation unit that generates a packet including timing data at an end of the packet for specifying to the external device a start timing for processing related to photography, a transmitting unit that transmits the packet to the external device by wireless communication, and a transmission control unit that changes a state of packet transmission by the transmission unit according to the start timing of the processing related to photography, comprises: a reception unit that receives the packet; a detection unit that detects that the state of packet transmission has changed; and a processing execution unit that starts the processing related to photography, when a fact that the state of packet transmission has changed has been detected.

According to the 17th aspect of the present invention, in the external device according to the 16th aspect, it is preferred that the detection unit detects that the state of packet transmission has changed, when it has detected that a transmission of the timing data has been stopped.

According to the 18th aspect of the present invention, in the external device according to the 16th aspect, it is preferred that the detection unit detects that the state of packet transmission has changed, when it has detected that a data pattern of the timing data has changed.

According to the 19th aspect of the present invention, in the external device according to the 16th aspect, it is preferred that: in the packet, command data for commanding an execution of the processing related to photography is included before the timing data; and the processing execution unit starts processing according to the command data.

According to the 20th aspect of the present invention, in the external device according to the 19th aspect, it is preferred that: the external device is an electronic flash unit; and the command data is data for commanding the electronic flash unit to perform light emission.

According to the 21st aspect of the present invention, in the external device according to the 20th aspect, it is preferred that: the information communication device is a camera; and in the packet there is included, before the timing data, data that specifies a time period over which a shutter of the camera is fully opened.

According to the 22nd aspect of the present invention, in the external device according to the 19th aspect, it is preferred that in the packet, there is included check data, after the command data and before the timing data, for checking data included in the packet.

According to the 23rd aspect of the present invention, in the external device according to the 16th aspect, it is preferred that: the information communication device is a camera; the external device is an electronic flash unit; the start timing of the processing related to photography is a timing at which the camera starts photometry, and a timing of a start of a preliminary emission of light that the electronic flash unit performs before a main emission of light; and the processing execution unit starts the preliminary light emission at the start timing of the processing related to photography.

According to the 24th aspect of the present invention, in the external device according to the 16th aspect, it is preferred that: the information communication device is a camera; the external device is an external camera that is connected by wireless to the camera; a timing of the processing related to photography is a timing at which a shutter of the camera is opened, and a timing at which a shutter of the external camera is opened; and the processing execution unit opens the shutter at the start timing of the processing related to photography.

According to the 25th aspect of the present invention, in the external device according to the 16th aspect, it is preferred that: the external device is an electronic flash unit; and there is further provided a transmission unit that, according to a request from the camera, transmits to the camera a packet including information that specifies a state of affairs during light emission.

According to the 26th aspect of the present invention, in the external device according to the 25th aspect, it is preferred that the information that specifies the state of affairs during light emission is at least one of information that specifies that the electronic flash unit has performed full light emission, and information related to a difference between a target amount of light during light emission and an actual amount of light emitted.

According to the 27th aspect of the present invention, in the information communication device according to the 1st aspect, it is preferred that the information communication device further comprises a detachable wireless communication unit for performing wireless communication with the external device, including at least the transmitting unit.

According to the 28th aspect of the present invention, in the external device according to the 16th aspect, it is preferred that the external device further comprises a detachable wireless communication unit for performing wireless communication with the information communication device, including at least the reception unit.

BRIEF DESCRIPTION OF THE DRAWINGS

FIGS. 7A through 7D are figures showing concrete examples of light emission command packets in a first embodiment;

FIGS. 16A through 16D are figures showing concrete examples of a light emission gain packet and a light emission command packet, in a second embodiment;

DESCRIPTION OF THE PREFERRED EMBODIMENTS

Embodiment One

Figure 1:
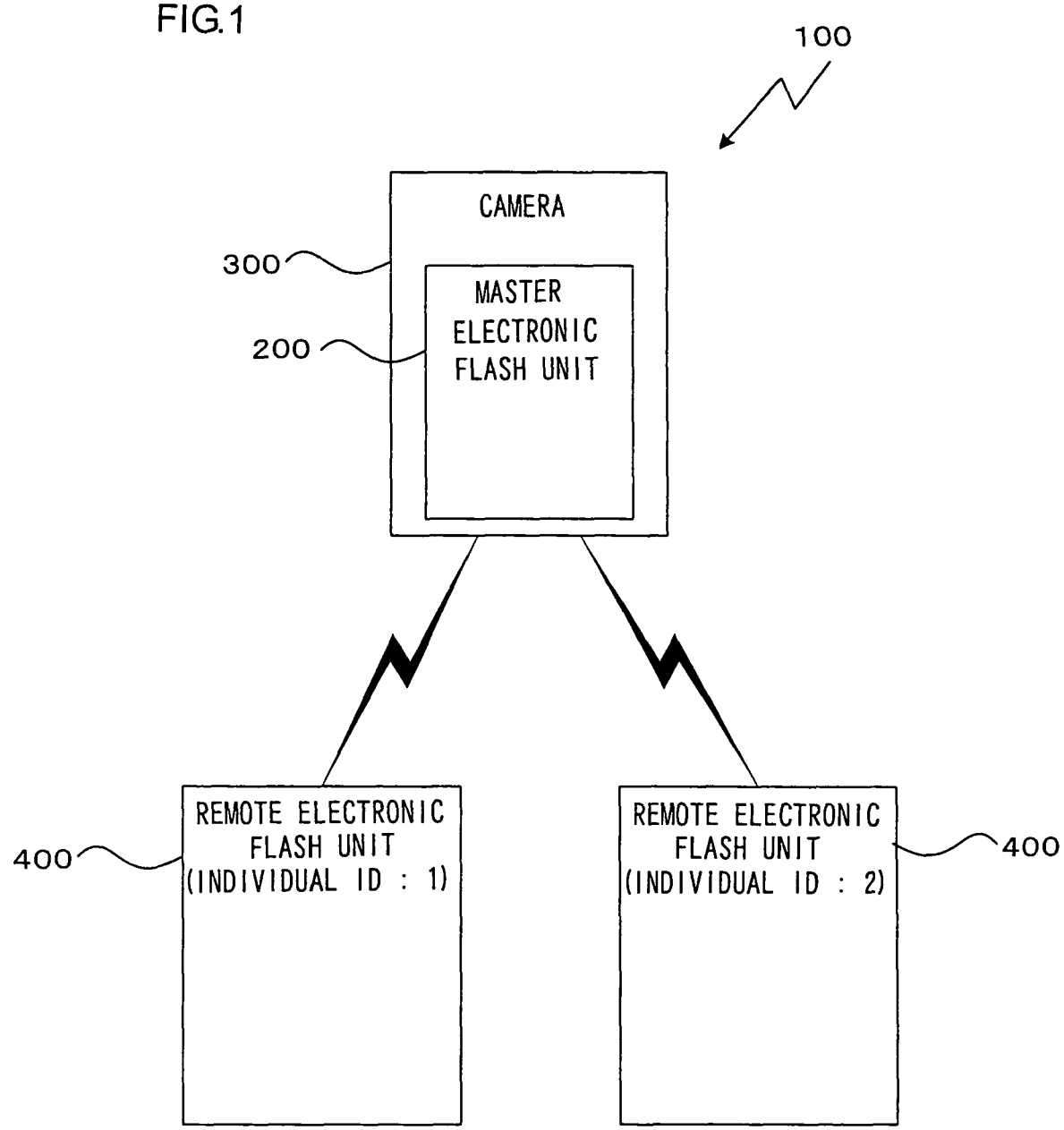
FIG. 1 is a block diagram showing the structure of an embodiment of a light emission control system.

FIG. 1 is a block diagram showing the structure of one embodiment of a light emission control system according to the first embodiment. In this light emission control system 100, a camera 300 to which a master electronic flash unit 200 is mounted, and one or more external remote electronic flash units 400 are connected together using a wireless system such as a wireless LAN, Bluetooth, Zigbee or the like. However, it will be supposed that communication is not performed using any of these communication methods or communication standards, but by some idiosyncratic method. It should be understood that this light emission control system 100 includes one camera 300 to which the master electronic flash unit 200 is mounted, and at least one remote flash unit 400 that constitutes an external device. In the figure, there is shown a concrete example for the case consisting of one camera 300 and two remote flash units 400. The master electronic flash unit 200 may also be termed an information communication device.

Figure 2:
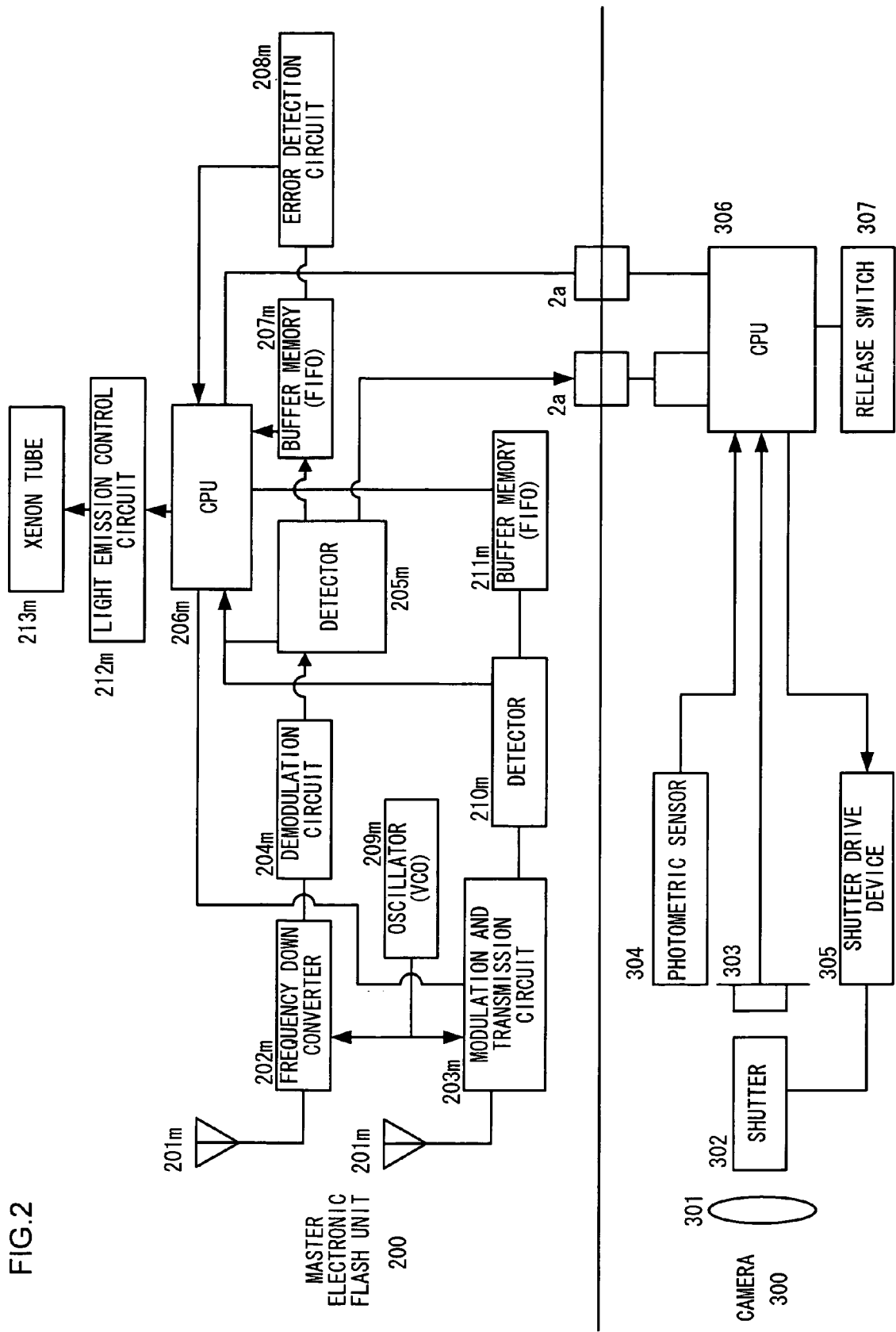
FIG. 2 is a block diagram of a camera 300 to which a master electronic flash unit 200 is mounted.

A block diagram of the camera 300 to which the master electronic flash unit 200 is mounted is shown in FIG. 2. The master electronic flash unit 200 and the camera 300 are connected together via hot shoe X contact points 2*a* that are provided at the upper portion of the camera 300. Moreover, a block diagram of a remote electronic flash unit 400 is shown in FIG. 3.

Figure 3:
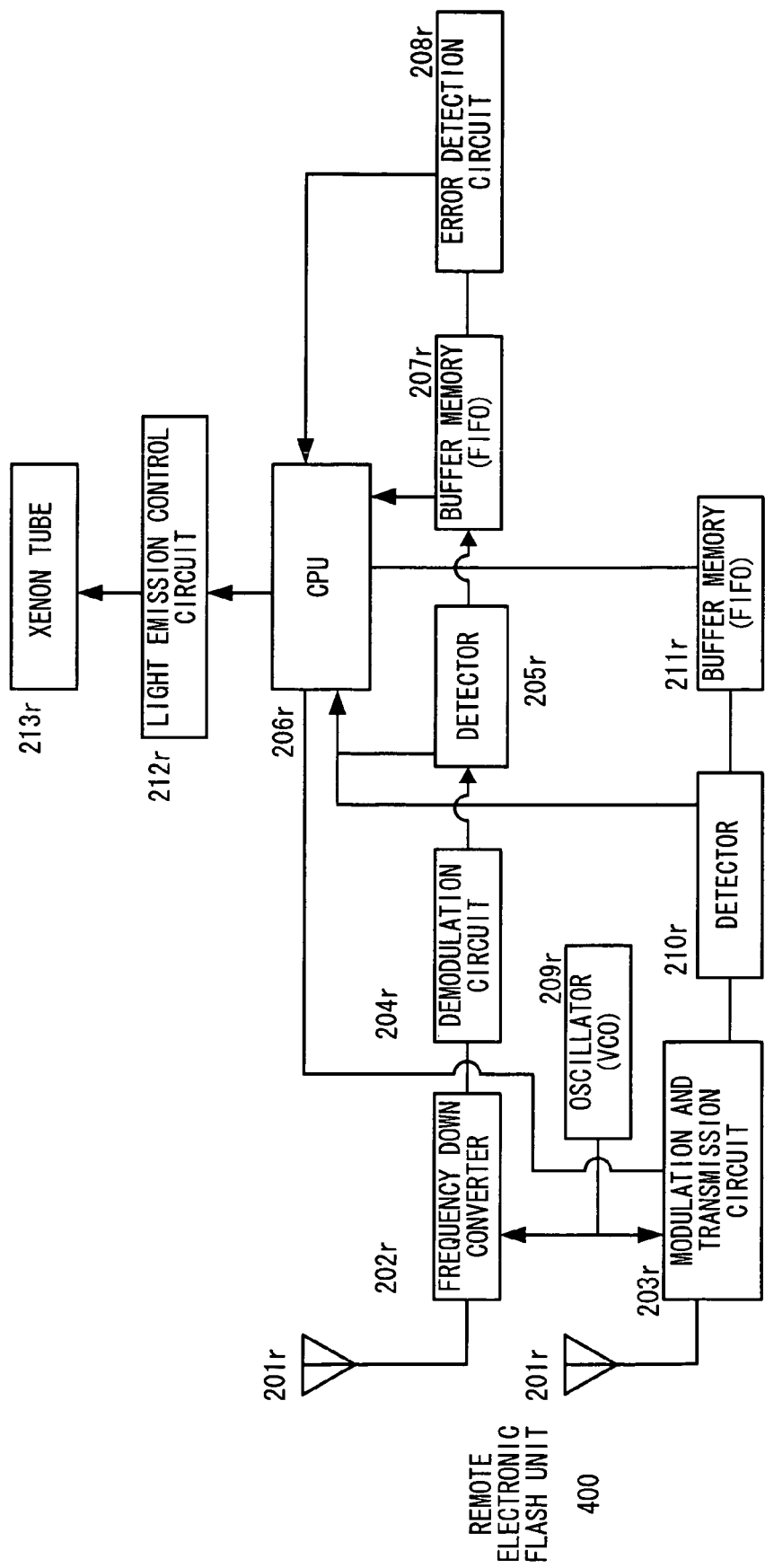
FIG. 3 is a block diagram of a remote electronic flash unit 400.

It should be understood that, since the master electronic flash unit 200 and the remote electronic flash units 400 have the same structure, accordingly as shown in FIG. 2 and FIG. 3, the reference symbols appended to the various elements thereof have numerical portions that are the same. And, in order to distinguish between them, for the master electronic flash unit 200, "m" is appended after the reference numbers appended to the various elements, whereas, for the remote electronic flash units 400, "r" is appended to their reference numbers. In this embodiment, the structure of the master electronic flash unit 200 will be explained as being representative, and explanation of the structure of the remote electronic flash units 400 will be omitted.

The master electronic flash unit 200 includes an antenna 201*m*, a frequency down converter 202*m*, a modulation and transmission circuit 203*m*, a demodulation circuit 204*m*, detectors 205*m* and 210*m*, a CPU 206*m*, buffer memories 207*m* and 211*m*, an error detection circuit 208*m*, an oscillator 209*m*, a light emission control circuit 212*m*, and a xenon tube 213*m*. And the camera 300 includes a lens 301, a shutter 302, an image sensor 303, a photometric sensor 304, a shutter drive device 305, a CPU 306, and a release switch 307.

Here, the antenna 201*m*~the buffer memory 211*m* that are included in the master electronic flash unit 200 (except for the CPU 206*m*) constitute a wireless module for wireless communication with the remote electronic flash unit 400. In other words, in the example shown in FIG. 2, in the camera 300 with the master electronic flash unit 200 fitted thereto, the master electronic flash unit 200 includes a wireless module. It should be understood that, if no wireless module is fitted to the master electronic flash unit 200, but instead a wireless module is fitted to the camera 300, then wireless communication will be possible between the remote electronic flash units 400 and the camera 300 to which the wireless module is fitted. Moreover, if wireless modules are mounted both to the master electronic flash unit 200 and also to the camera 300, then, wireless communication will be possible between either one of these via its wireless module, for example the wireless module of the master electronic flash unit 200, and the remote electronic flash unit 400.

In this manner, with this light emission control system 100 that includes the camera 300 to which the master electronic flash unit 200 is mounted and the remote electronic flash units 400, when the release switch 307 of the camera 300 is depressed by the user, it is necessary for the timings of the opening of the shutter 302 and the capture by the image sensor 303 of an image of the photographic subject that is input via the lens 301, the timing of light emission by the master electronic flash unit 200, and the timings of light emission by all of the remote electronic flash units 400, all to agree with one another. In other words, it is necessary for the starting timings for processing related to photography by all of these devices to agree with one another.

Now, the usual method for making the timing of opening of the shutter 302 and the timing of light emission by the master electronic flash unit 200 agree with one another will be explained. The shutter 302 includes two members that are electrically controlled by the CPU 306 and that are termed the front curtain and the rear curtain, and it is necessary to make the master electronic flash unit 200 perform its light emission during the time interval from the time point at that the travel of the front curtain has been completed to the time point directly before the travel of the rear curtain starts. It should be understood that, since these travels of the front curtain and the rear curtain are physical movements, their shifting occupies a certain period of time, the so-called travel time period. Due to this, the camera 300 is provided with the X contact points 2*a* that act as a switch for detecting the completion of travel at the timing that the travel of the front curtain has been completed, and the light emission timing is notified to the electronic flash unit by outputting the signal from this switch (the X signal) to the electronic flash unit.

It should be understood that, as light emission modes for the electronic flash units, there are a front curtain sync mode in which light emission is started at the time point that the travel of the front curtain has been completed, and a rear curtain sync mode in which the light emission is started directly before the travel of the rear curtain starts, and is stopped at the time point that the travel of the rear curtain starts.

Figure 4:
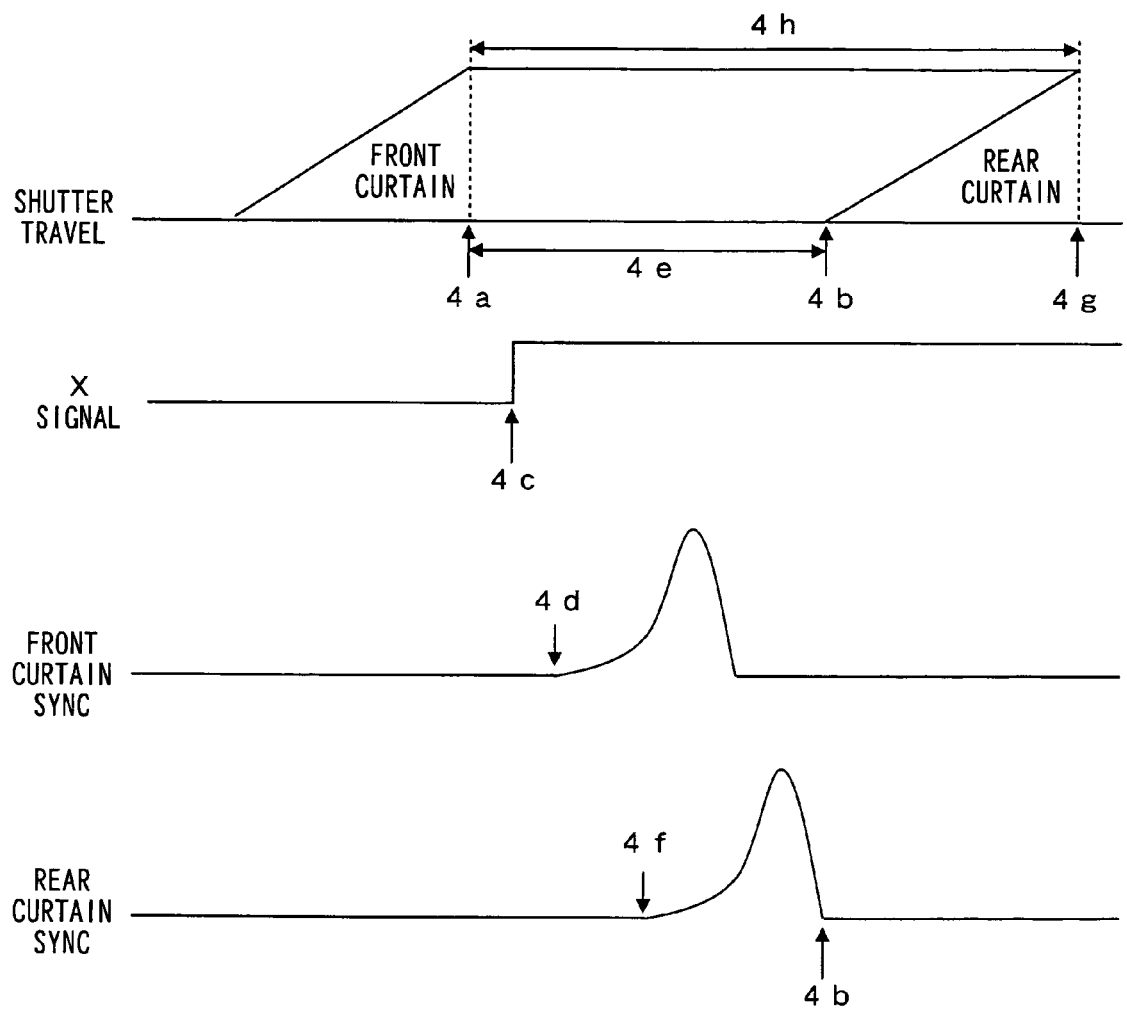
FIG. 4 is a figure showing travel times of a shutter in a front curtain sync mode and a rear curtain sync mode.

For example, if the light emission mode is set to the front curtain sync mode, then, as shown in FIG. 4, the CPU 306 outputs an X signal to the CPU 206m via the X contact points 2a at the time point 4a that the travel of the front curtain of the shutter 302 has been completed. And the CPU 206m commands the light emission control circuit 212m to start light emission at the time point 4c that this X signal has been detected. And the light emission control circuit 212m starts light emission at the time point 4d that it has detected that this light emission start command has been issued from the CPU 206m. Due to this, the master electronic flash unit 200 performs its light emission during the shutter fully opened time period 4e from the time point 4a at which the travel of the front curtain has been completed to the time point 4b at which the rear curtain starts its travel.

Moreover, if the light emission mode is the rear curtain sync mode, then the CPU 306 outputs an X signal to the CPU 206m via the X contact points 2a at the time point 4a that the travel of the front curtain of the shutter 302 has been completed. And the CPU 206m determines a light emission start timing such that the light emission will be completed at the time point 4b that the rear curtain starts its travel, and commands the light emission control circuit 212m to start light emission at the timing that has been determined. And the light emission control circuit 212m starts light emission at the time point 4f that it has detected that the light emission start command has been issued from the CPU 206m, and maintains this light emission until the time point 4b that the rear curtain starts its travel. Due to this, the master electronic flash unit 200 starts its light emission directly before the time point 4b that the rear curtain starts its travel, and ends its light emission at the time point 4b that the rear curtain starts its travel. It should be understood that the time interval 4h shown in FIG. 4 between the time point 4a that the front curtain ends its travel and the time point 4g that the rear curtain ends its travel indicates the shutter time of the shutter 302.

Now, the case must further be considered of making the timings of light emission by the remote electronic flash units 400 and the timings of opening of the shutter 302 and of light emission by the master electronic flash unit 200 agree with one another. In this case, it is not possible to output the X signal to the remote electronic flash units 400 by connecting the remote electronic flash units 400 directly to the X contact points 2a, since the remote electronic flash units 400 and the master electronic flash unit 200 are connected together by wireless.

Due to this, in this embodiment, it is arranged to transmit packets for commanding emission of light to the remote electronic flash units 400 from the master electronic flash unit 200, and to notify the light emission timing to the remote electronic flash units 400 by using data included in these packets. Since the emission of light is performed for photography, the emission of light is termed processing related to photography. First, the case in which the light emission mode is set to the front curtain sync mode will be explained.

When the light emission mode is set to the front curtain sync mode, the CPU 206m of the master electronic flash unit 200 notifies the light emission timing to the remote electronic flash units 400 by changing the packet transmission state at the timing at which it is detected that the X signal has been output from the CPU 306 of the camera 300. And, when the remote electronic flash units 400 have detected that the packet reception state of the packets from the master electronic flash unit 200 has changed, they detect this timing as the detection timing of the X signal, in other words as the light emission timing. In concrete terms, the master electronic flash unit 200 and the remote electronic flash units 400 perform processing as follows.

When the CPU 206m of the master electronic flash unit 200 detects that a packet transmission start command has been issued from the CPU 306, it generates a packet according to a format for digital communication in which, along with command data for commanding a remote electronic flash unit 400 to perform light emission, timing data is also included for making the light emission timings agree with one another.

Figure 5:
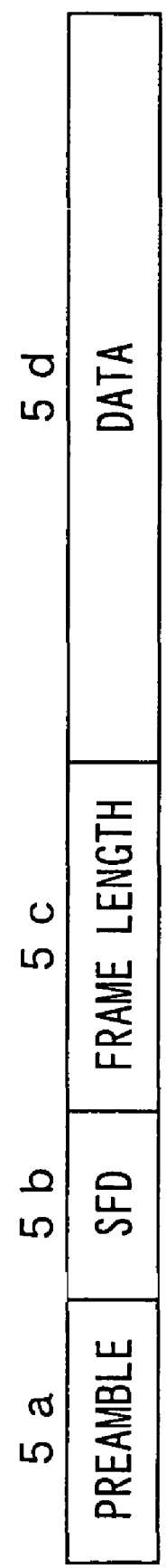
FIG. 5 is a first figure showing an example of a first packet created by a CPU 206*m*.

The CPU 206m creates a packet of the format, for example, shown in FIG. 5. In FIG. 5, the preamble 5a is data that is transmitted at the beginning of communication, such as a preparatory portion, and around four bytes of preamble 5a must compulsorily be transmitted. The preamble 5a is set to a fixed bit pattern such as, for example, 0, 0, 0, 0 . . . .

And an SFD (Start of Frame Delimiter) 5b is one byte of data for synchronization, that is appended at the header portion of the packet after the preamble 5a. This SFD 5b is fixed data intrinsic to the communication method, and functions to prevent erroneous operation if signal interference with other communications occurs. In other words, if a packet is received by the reception side including an SFD that does not agree with a pattern for the data in the SFD that is set in advance, then it is decided that this packet, on its own, is not a packet that should be received. And the frame length 5c is one bye of data that specifies the amount of data (i.e. the number of bytes) in the packet.

Figure 6:
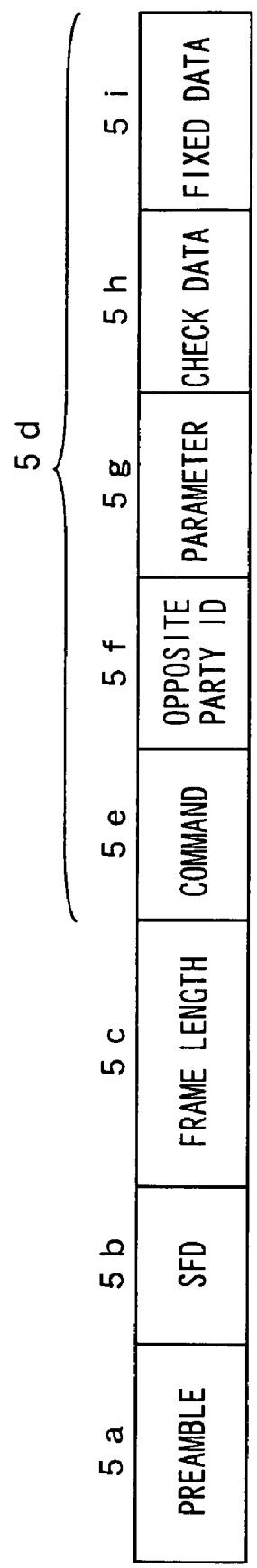
FIG. 6 is a second figure showing this example of a first packet created by the CPU 206*m*.

Then, as shown in FIG. 6, the data 5d that follows includes a command 5e, an opposite party ID 5f, a parameter 5g, and check data 5h. In the command 5e, command data is set for commanding the remote electronic flash unit 400 to perform processing related to photography. The opposite party ID 5f includes the ID of the remote electronic flash unit 400 that is the subject that should execute the control command defined by the command 5e. In other words, the remote electronic flash unit 400 that is designated by the opposite party ID 5f is commanded to execute the control command that is defined by the command 5e.

It should be understood that an ID that is individual to each of the remote electronic flash units 400 (i.e. an individual ID) is attached to each of these units 400, so that each of the remote electronic flash units 400 can be uniquely identified with this individual ID thereof.

Accordingly, in this opposite party ID 5f, it is possible to designate this individual ID, thus designating the subject that is to execute the command 5e. Moreover, it is also possible to designate an ID (an "all-device ID"), in order to designate all of the remote electronic flash units 400 as being the subjects that are to execute the command 5e. For example, if the individual IDs of the two remote electronic flash units 400 shown in FIG. 1 are "1" and "2", then it is possible to designate the all-device ID "0" when both of these flash units together are to be denoted. Furthermore, for example, "M"

may also be appended to the master electronic flash unit 200 as an ID that denotes the master electronic flash unit 200.

According to the above, if it is desired for the same command 5e to be executed by all of the remote electronic flash units 400, then, by designating the all-device ID in the opposite party ID 5f, it is possible to command the control command that is defined by the command 5e to be executed by all of the remote electronic flash units 400 together. In other words if, for a remote electronic flash unit 400 that has received a packet, its own individual ID is included in the opposite party ID 5f, or if the all-device ID is included therein, then this flash unit 400 recognizes that, itself, it is to be the subject that executes the control command defined by the command 5e.

The parameter 5g is a control parameter for executing the control command that is defined by the command 5e. For example, if a light emission command has been designated for commanding the remote electronic flash units 400 to perform light emission, then data is set in this field that designates the amount of emitted light for each of the remote electronic flash units 400. And the check data 5h is data for error checking in order to prevent erroneous operation, such as a checksum or a CRC or the like. In this embodiment, the command 5e and the parameter 5g are termed control information for controlling the remote electronic flash units 400.

Furthermore, at the end of the data 5d, there is appended fixed data 5i that consists of the repetition of a predetermined data pattern, and this constitutes timing data that is used for making the light emission timings between the master electronic flash unit 200 and the remote electronic flash units 400 agree with one another. For example, a plurality of one-byte data patterns "10101010" may be appended as the fixed data 5i.

The CPU 206m temporarily stores this packet that it has created in the buffer memory 211m, and then commands the modulation and transmission circuit 203m to start packet transmission. In other words, after the packet has been output from the buffer memory 211m to the detector 210m, it is then output to the modulation and transmission circuit 203m. And the modulation and transmission circuit 203m modulates this packet onto a signal that can be transmitted by wireless at a predetermined frequency, and then outputs this to the remote electronic flash unit 400 via the antenna 201m upon the form of a carrier wave. This predetermined frequency is determined by an oscillator 209m. And the remote electronic flash unit 400 receives this packet via its antenna 201r in the form of a carrier wave.

When the CPU 206m detects the X signal from the CPU 306 of the camera 300, it commands the light emission control circuit 212m to start light emission. Due to this, it is possible to make the timing of the light emission by the master electronic flash unit 200 and the timing at which the front curtain of the shutter of the camera 300 completes its travel agree with one another. Moreover, when the CPU 206m detects the X signal from the CPU 306 of the camera 300, then it commands the remote electronic flash unit 400 to perform its light emission, by changing the state of packet transmission to the remote electronic flash unit 400.

In this embodiment, the CPU 206m notifies the light emission timing to the remote electronic flash units 400 by changing the transmission state of the fixed data 5i. For example, the CPU 206m may notify the light emission timing to the remote electronic flash units 400 by stopping the transmission of the fixed data 5i at the light emission timing. Or, the CPU 206m may notify the light emission timing to the remote electronic flash units 400 by changing the data pattern of the fixed data 5i at the light emission timing. For example, the CPU 206m may change the data pattern of the fixed data 5i to "00110011" at the light emission timing. It should be understood that, in this embodiment, the case in which the CPU 206m stops the transmission of the fixed data 5i at the light emission timing will be explained.

FIG. 7A is a figure showing a concrete example of a light emission command packet created by the CPU 206m for commanding a remote electronic flash unit 400 to perform light emission. It should be understood that the CPU 306 of the camera 300 commands the CPU 206m to start transmission of this light emission command packet at the timing that the front curtain of the shutter 302 starts its travel. And, when the start of light emission command packet transmission is commanded from the CPU 306, the CPU 206m starts to generate the light emission command packet as shown in FIG. 7A.

As shown in FIG. 7A, this light emission command packet consists of the above described preamble 5a, SFD 5b, frame length 5c, and data 5d. Here, the contents of the data 5d will be described in detail.

In this light emission command packet, as the command 5e, there is included a light emission command, that is command data for commanding the remote electronic flash unit 400 to perform its light emission. Moreover, as the opposite party ID 5f, the individual IDs described above are set, and, for each of the remote electronic flash units 400 that have the individual IDs "1" and "2", there is set a different parameter 5g. In other words, the remote electronic flash unit 400 whose individual ID is "1" and the remote electronic flash unit 400 whose individual ID is "2" are respectively commanded to provide light emission with different amounts of emitted light. And, after this, the check data 5h is included, and after that, the fixed data 5i is included.

It should be understood that, if the remote electronic flash unit 400 whose individual ID is "1" and the remote electronic flash unit 400 whose individual ID is "12" are both to be commanded to emit the same amount of emitted light, then, as shown in FIG. 7B, the all-device ID "0" described above may be set as the opposite party ID 5f, and the common amount of emitted light may be set as the parameter 5g.

In a remote electronic flash unit 400, the carrier wave that is received is input to the first frequency down converter 202r. After the packet that has been received has been converted to a predetermined low frequency by the frequency down converter 202r, it is output to the demodulation circuit 204r. This predetermined frequency is determined by the oscillator 209r. The signal that has been output is demodulated by the demodulation circuit 204r into a digital packet, that is output to the detected 205r.

The detector 205r reads in and analyzes the packet that has been input from its header, and, when it has been detected that the reading in of the SFD 5b, that constitutes the synchronization data, has been completed, then an interrupt signal is output to the CPU 206r. At this time, the detector 205r outputs this interrupt signal to the CPU 206r, only if the SFD 5b that has been read in and a data string that is set in advance agree with one another. Due to this, it is possible to prevent erroneous operation if signal interference with other communication takes place.

The detector 205r outputs the packet that has been read in to the buffer memory 207r and records it therein, and also a portion of this packet that has been recorded is output to the error detection circuit 208r. The error detection circuit 208r detects whether or not there is any error in the packet that has been received, on the basis of the check data 5h for error checking, included in the data 5d. The result of this detection is output to the CPU 206r.

Figure 8:
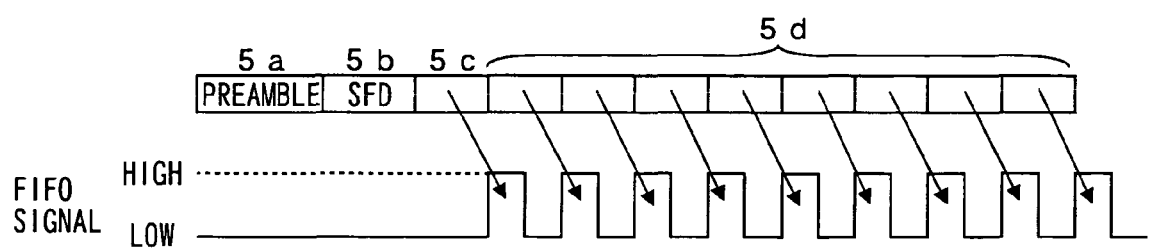
FIG. 8 is a figure schematically showing a method for reading in of data by a CPU 206*r*.

When the CPU 206r of the remote electronic flash unit 400 detects this interrupt signal from the detector 205, it starts to read in the packet that has been stored in the buffer memory 207r. In this embodiment, as for example shown in FIG. 8, the CPU 206r reads in the data after the frame length 5c that has been stored in the buffer memory 207r one byte at a time. In other words, a FIFO signal from the buffer memory 207r (which is FIFO) functions so as to go to high if one byte or more of data remains in the buffer memory 207r, and so as to go to low if all of the data has been read out and the buffer memory 207r has become empty.

Accordingly, when the frame length 5c (one byte) is initially stored in the buffer memory 207r, then the FIFO signal goes to high. When the CPU 206r detects that the reception of the frame length 5c has been completed by the FIFO signal going from low to high (i.e. by the FIFO signal rising), then it reads this out directly. Since the buffer memory 07r becomes empty when the frame length 5c is read out by the CPU 206r, accordingly the FIFO signal returns to low. And next, when the leading one byte of the data 5d is stored in the buffer memory 207r, since the FIFO signal goes to high, this is detected by the CPU 206r, and it reads out the one byte of data that has been stored in the buffer memory 207r.

By repeating this processing until the reception of the packet has been completed, the CPU 206r is able to read in the data in the packet that has been received, one byte at a time. It should be understood that, since the data in the packet is transmitted from the master electronic flash unit 200 at a constant bit rate and there are no interval time periods between the data, accordingly, if this type of method of reading out the data is employed, the rising slope of the FIFO signal takes place upon a constant cycle.

The CPU 206r continues to read in the data in the packets that are received one byte at a time in this manner, and when, at some timing, it has detected that the reception state of the fixed data 5i described above (in other words, its state of transmission by the master electronic flash unit 200) has changed, it detects this timing as being the output timing of the X signal, in other words as being the light emission timing. In concrete terms when, after having read in one byte of data that has been received from the master electronic flash unit 200, the CPU 206r does not detect the completion of reception of the next byte of data within some predetermined time period that is set in advance, then it determines that the transmission of the fixed data 5i has stopped, and detects this as being the light emission timing.

It should be understood that, here, as this predetermined time period, a time period is set in which a certain extra time has been added to the time period that is necessary for transferring one byte of the fixed data from the master electronic flash unit 200 to the remote electronic flash unit 400. For example, if the time period that is required for transferring one byte of the fixed data is 16 μsec, then 18 μsec, to which some extra time has been added, is set as the predetermined time period.

And, upon detection of the light emission timing, the CPU 206r outputs a signal to the light emission control circuit 212r for commanding the emission of light to be started. At this time, the CPU 206r outputs the amount of emitted light that is designated in the parameter 5g to the light emission control circuit 212r as the amount of light to be emitted. And, on the basis of this command from the CPU 206r, the light emission control circuit 212r causes the xenon tube 213r to perform light emission of the specified amount of light to be emitted.

Figure 9:
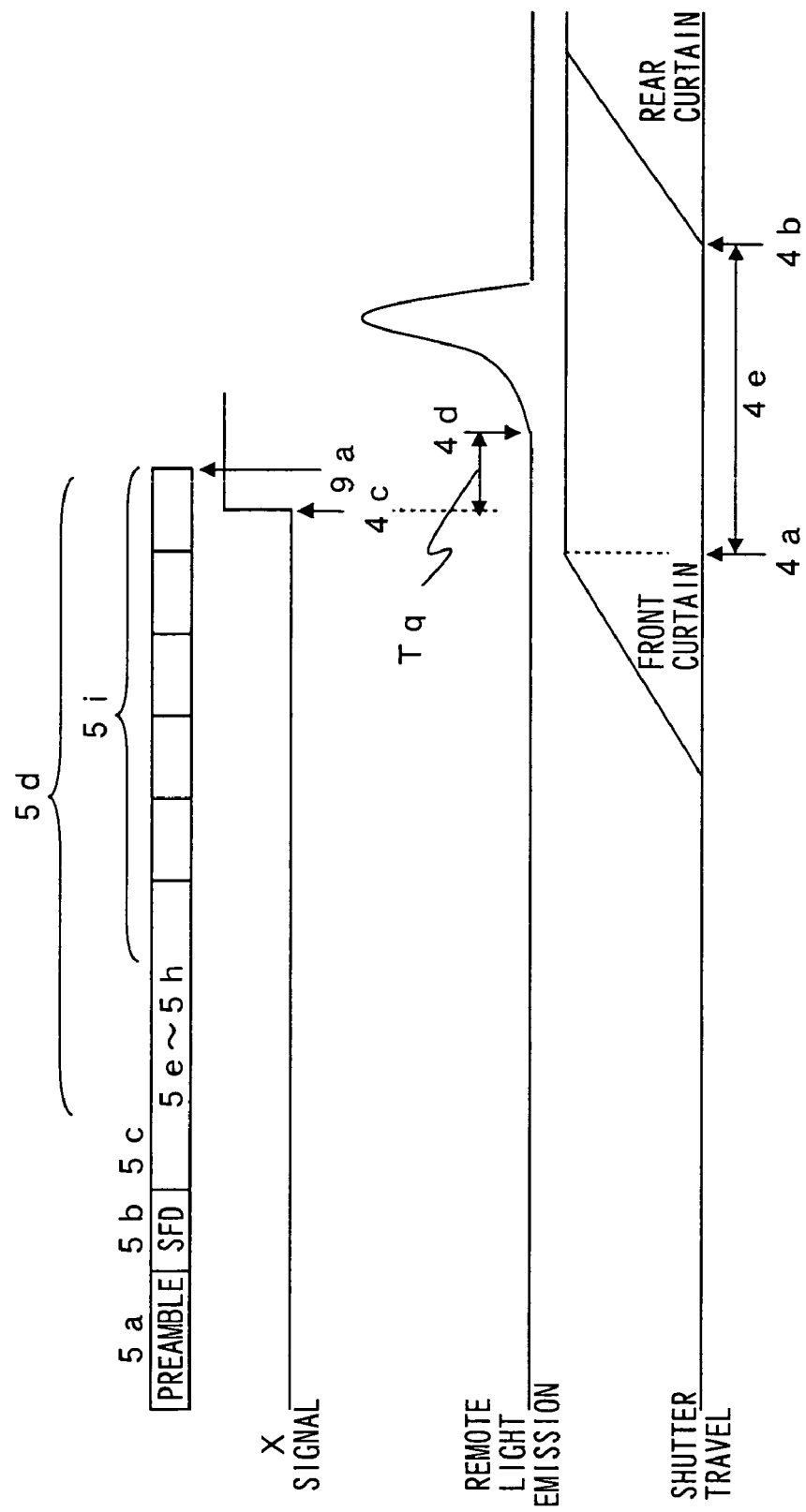
FIG. 9 is a figure schematically showing the output timing of an X signal, the travel start timings of a front curtain and a rear curtain, the timing of change of the transmission state of a packet output from the master electronic flash unit 200, and the light emission timing of the remote electronic flash unit 400.

FIG. 9 is a figure schematically showing the output timing of the X signal, the travel start timings of the front curtain and of the rear curtain, the timing of change of the transmission state of the packet output from the master electronic flash unit 200, and the timing of the light emission by the remote electronic flash unit 400. As shown in this FIG. 9, the X signal is output by the CPU 306 to the CPU 206m at the time point 4a that the front curtain of the shutter 302 has completed its travel. The CPU 206m stops transmitting the fixed data 5i at the time point 4c that it has received the X signal from the CPU 306. In concrete terms, the one byte of fixed data 5i that is being transmitted at the time point 4c becomes the final item of fixed data, and the transmission of the fixed data 5i stops at the time point 9a that the transmission of this final item of fixed data has been completed.

In the remote electronic flash unit 400, the CPU 206r detects the time point 4d at which it has been detected that the reception of the fixed data 5i from the master electronic flash unit 200 has stopped as being the light emission timing, and outputs a signal for commanding the light emission control circuit 212r to start the emission of light. Due to this, the remote electronic flash unit 400 is able to perform its light emission during the shutter fully opened time period, between the time point 4a at which the front curtain of the shutter 302 of the camera 300 has completed its travel and the time point 4b at which its rear curtain starts its travel.

It should be understood that, in the example shown in FIG. 9, a delay time period Tq occurs between the time point 4c at which the CPU 206m of the master electronic flash unit 200 has detected the X signal, and the time point 4d at which the CPU 206r of the remote electronic flash unit 400 detects the light emission timing. In theory, this delay time period Tq is a period that is less than or equal to the time period (16 μsec) that is needed for one byte of fixed data to be transferred from the master electronic flash unit 200 to the remote electronic flash unit 400, but actually minute time periods should be added thereto, due to considerations such as software overhead and the response time period of the light emission control circuit and the like, and there is a possibility that, at maximum, this delay time period may be around 50 μsec. However, if during normal flash photography the shutter time period 4h is set to 1/250 sec, then, since the shutter fully opened time period is around 1 msec, accordingly this delay time period is extremely short, so that no problem arises.

Next, the case that the light emission mode is set to the rear curtain sync mode will be explained. In this case, the CPU 206m of the master electronic flash unit 200 changes the transmission timing of the packet described above to a different timing than during the front curtain sync mode. In other words, in the case of the leading sync mode, when a packet transmission start command arrives from the CPU 306 of the camera 300, it is arranged for the CPU 206m to start the generation and transmission of a packet. By contrast, in the case of the rear curtain sync mode, it is arranged for the CPU 206m to create the packet when a packet transmission start command has arrived from the CPU 306 of the camera 300, and to transmit this packet thereafter, after a predetermined time period has elapsed.

In concrete terms, the CPU 206m creates the packet described above when a packet transmission start command arrives from the CPU 306, and stores the packet in its buffer memory 211m. And the CPU 206m starts timing by a transmission start timer for timing the time period until the start of transmission of the packet to the remote electronic flash unit 400. Thereafter, the transmission of the packet to the remote electronic flash unit 400 is started at the time point that the time period measured by the transmission start timer reaches a predetermined time period. As this predetermined time period, for example, a time period may be set that is the difference between the light emission start timing 4d during the front curtain sync mode, and the light emission start timing 4f during the rear curtain sync mode, as described above in FIG. 4.

Since, in this case of the rear curtain sync mode, the input of the X signal from the camera 300 is delayed more than in the case of the front curtain sync mode, accordingly the data length of the fixed data 5i is (undesirably) longer if the transmission of the packet were to be started at the same timing as in the leading sync mode. However by, as described above, delaying the packet transmission start timing during this rear curtain sync mode by more than during the front curtain sync mode, it is possible to reduce the communication load by reducing the data length of the fixed data 5i that is transmitted.

Furthermore, in this case of the trailing sync mode, as described above, it is necessary to make the remote electronic flash unit 400 perform its light emission so that the light emission is completed at the time point 4b that the travel of the rear curtain is started. Due to this, the CPU 206m transmits, within the packet, data (a time period for the light emission to be continued) that specifies the time period over which it is necessary to continue the emission of light, and the CPU 206r of the remote electronic flash unit 400 controls the light emission control circuit 212r so as to prolong the emission of light during this time period for light emission to be continued. It should be understood that the CPU 206m determines the time period for the light emission to be continued in the following manner.

That is, the CPU 206m acquires the shutter time 4h from the camera 300, for example 1/250 sec, and calculates a shutter fully opened time period 4e on the basis thereof. For example, the CPU 206m may calculate the shutter fully opened time period 4e as being the time period obtained by subtracting 1 msec from the shutter time period 4h. And the CPU 206m includes this data that specifies this shutter fully opened time period 4e in the packet as the time period for light emission to be continued. For example, the CPU 206m may include data for specifying the time period for light emission to be continued in the packet as the parameter 5g, as shown in FIG. 7C.

It should be understood that, even if it is arranged to cause the remote electronic flash unit 400 to continue the emission of light in this manner over the time period for light emission to be continued, due to the characteristics of the xenon tube 213r and of the light emission control circuit 212r, some light emission continues even during a fixed time period, for example around 100 μsec, after the light emission has been stopped, so that some light emission remains even after the rear curtain has started its travel, and this is undesirable. However, if it is considered that the travel time period of the rear curtain is, for example, 3 msec, then it will be understood that this time period over which the light emission continues is an extremely minute time period, and its influence is extremely small.

Moreover it should be understood that, while it may be arranged for the amount of light emitted by each of the remote electronic flash units 400 set in the parameter 5g of the light emission command packet described above to be a predetermined amount of emitted light that is set in advance, it would also be acceptable to arrange to cause the remote electronic flash units 400 to perform preliminary light emission (monitor light emission) in advance before the light emission during photography (the main light emission), and to set it on the basis of the amount of emitted light during the preliminary light emission. In concrete terms, the CPU 306 of the camera 300 may command each of the remote electronic flash units 400 to perform a preliminary light emission in advance, and may measure the amount of emitted light at this time with the photometric sensor 304. At this time, if there are a plurality of the electronic flash units 400, then each of these remote electronic flash units 400 is commanded to perform an individual episode of preliminary light emission, and the preliminary amounts of light emitted by each of the remote electronic flash units 400 are measured.

On the basis of the results of photometry at this time, the CPU 306 calculates the amounts of emitted light required during photography by each of the remote electronic flash units 400, and sets these amounts of emitted light that have been calculated in the parameter 5g of the light emission command packet described above. If, in this manner, the amounts of light to be emitted during the main light emission are determined by causing the remote electronic flash units 400 to perform episodes of preliminary light emission in advance, then it is necessary to make the timings of the preliminary light emissions by the remote electronic flash units 400 and the timings of the starts of photometry by the photometric sensor 304 agree with one another.

Due to this, the CPU 306 commands the CPU 206m of the master electronic flash unit 200 to start the transmission of a preliminary light emission command packet. And the CPU 206m generates a preliminary light emission command packet as, for example, shown in FIG. 7D, and transmits this packet to the remote electronic flash unit 400. In other words, a preliminary light emission command packet is transmitted in which a preliminary light emission command for commanding the remote electronic flash unit 400 to perform preliminary light emission is included as the command 5e, and that sets an amount of light to be emitted during the preliminary light emission in the parameter 5g.

It should be understood that, if there are a plurality of remote electronic flash units 400, then, since it is necessary to cause each of the remote electronic flash units 400 to perform an individual light emission and to perform photometry thereof, accordingly the individual ID of the remote electronic flash unit 400 that is to be the recipient is set in the opposite party ID 5f of the preliminary light emission command packet. And a preliminary light emission command packet is transmitted to each of the remote electronic flash units 400, in which its own individual ID and amount of emitted light are specified. When the CPU 206m has detected that a preliminary light emission command signal has been input from the CPU 306 for notifying that the preliminary light emission command timing has arrived, then it stops the transmission of the fixed data 5i, in a similar manner to the case of the light emission command packet described above.

In the camera 300, upon outputting the preliminary light emission command signal to the CPU 206m of the master electronic flash unit 200, the CPU 306 simultaneously performs photometry by controlling the photometric sensor 304. Moreover, in the remote electronic flash unit 400, in a similar manner to when of the light emission command packet described above is received, at the time point that the CPU 206r has detected that the reception of the fixed data 5i has stopped, it performs the emission of monitor light at an emitted light amount that is set in the parameter 5g. Due to this, it is possible to make the timing of photometry by the photometric sensor 304 and the timing of preliminary light emission by the remote electronic flash unit 400 agree with one another.

Figure 10:
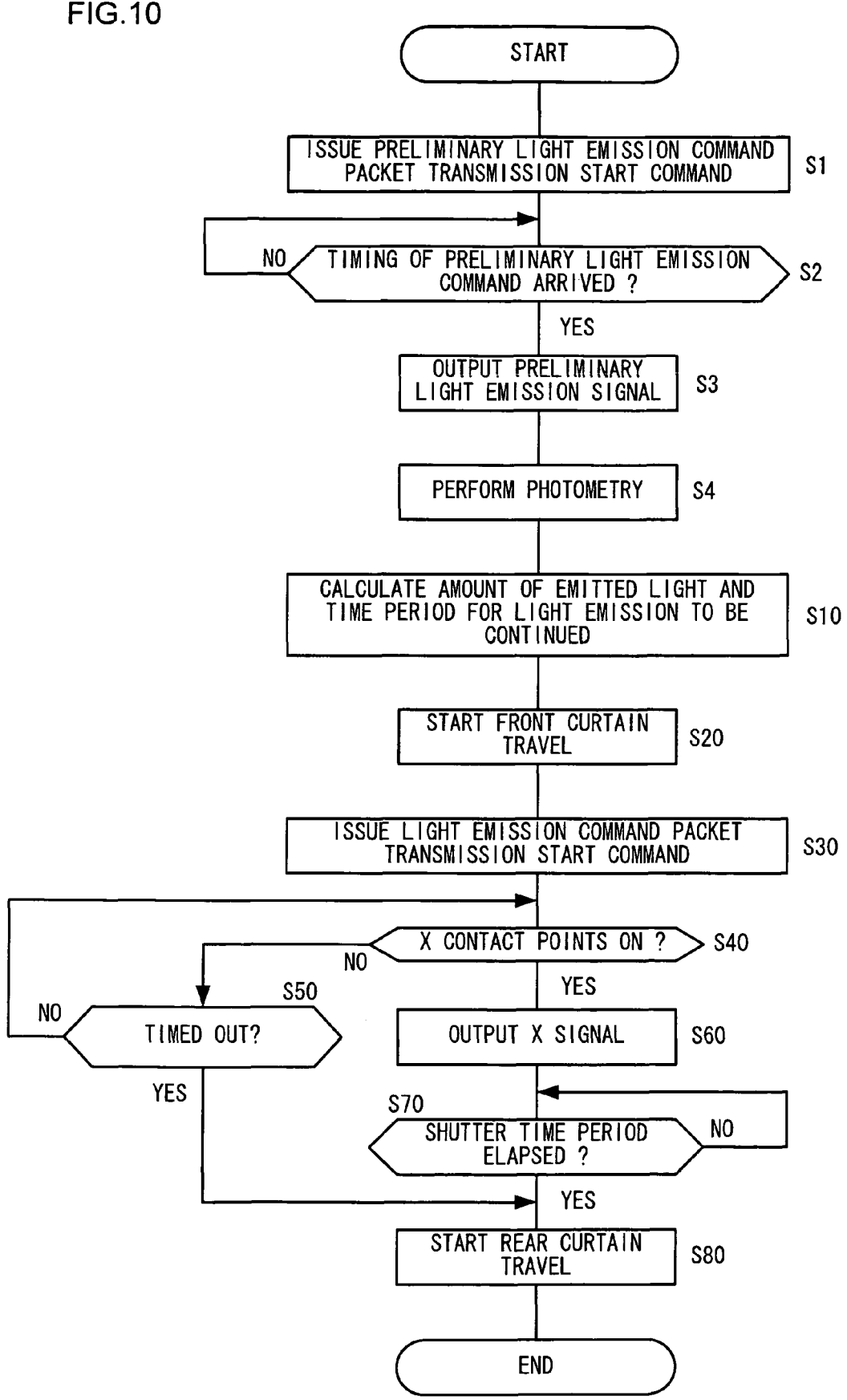
FIG. 10 is a flow chart showing processing executed by a CPU 306 of a camera 300 according to the first embodiment.

FIG. 10 is a flow chart showing the processing performed by the CPU 306 of the camera 300 in this first embodiment. The processing shown in FIG. 10 is executed as a program that starts when depression of the release switch 307 by the user has been detected.

In a step S1, the CPU 306 commands the CPU 206m of the master electronic flash unit 200 to start the transmission of the above described preliminary light emission command packet. Then the flow of control proceeds to a step S2, in which the CPU 306 makes a decision as to whether or not a preliminary light emission command timing that is set in advance has arrived. If it is decided that the preliminary light emission command timing has arrived, then the flow of control proceeds to a step S3, in which a preliminary light emission command signal is output to the CPU 206m of the master electronic flash unit 200, in order to notify it of the fact that the preliminary light emission command timing has arrived; and then the flow of control proceeds to a step S4. In this step S4, the CPU 306 controls the photometric sensor 304 and performs photometry. Then the flow of control is transferred to a step S10.

It should be understood that, if there are a plurality of remote electronic flash units 400, then it is necessary to execute the processing of the steps S1 through S4 with each of the remote electronic flash units 400 as the subject, in order to command each of these remote electronic flash units 400 to perform preliminary light emission individually, and to measure the resulting light emissions.

In the step S10, the CPU 306 calculates the amounts of light to be emitted by the master electronic flash unit 200 and the remote electronic flash unit 400, and, in the case of the rear curtain sync mode, the time periods for light emission to be continued, and then the flow of control is transferred to a step S20. At this time, the amount of emitted light by the remote electronic flash unit 400 is determined on the basis of the result of photometry during the preliminary light emission described above. And in the step S20, the shutter drive device 305 is controlled, the travel of the front curtain of the shutter 302 is started, and then the flow of control proceeds to a step S30. In this step S30, the CPU 206m of the master electronic flash unit 200 is commanded to start transmission of the light emission command packet. At this time, the amount of light to be emitted and also the time period for the light emission to be continued are output to the CPU 206m of the master electronic flash unit 200. Then the flow of control proceeds to a step S40.

In the step S40, a decision is made as to whether or not the X contact points 2a from the shutter 302 are ON. If it is decided that the X contact points 2a are not ON, then the flow of control proceeds to a step S50, in which it is decided whether or not a predetermined time period has elapsed, in other words whether or not the processing has timed out. If it has been decided that time out has taken place, then the flow of control is transferred to a step S80 that will be described hereinafter. By contrast, if it is decided that time out has not taken place, then the flow of control returns to the step S40. On the other hand, if in the step S40 it is decided that the X contact points are ON, then the flow of control proceeds to a step S60.

In this step S60, an X signal is output to the CPU 206m of the master electronic flash unit 200, and then the flow of control proceeds to a step S70. In this step S70, a decision is made as to whether or not the shutter time period 4h has elapsed from the start of the travel of the front curtain. If it is decided that the shutter time period has elapsed, then the flow of control proceeds to the step S80, in which the shutter drive device 305 is controlled and the travel of the rear curtain of the shutter 302 is started. Then processing terminates.

Figure 11:
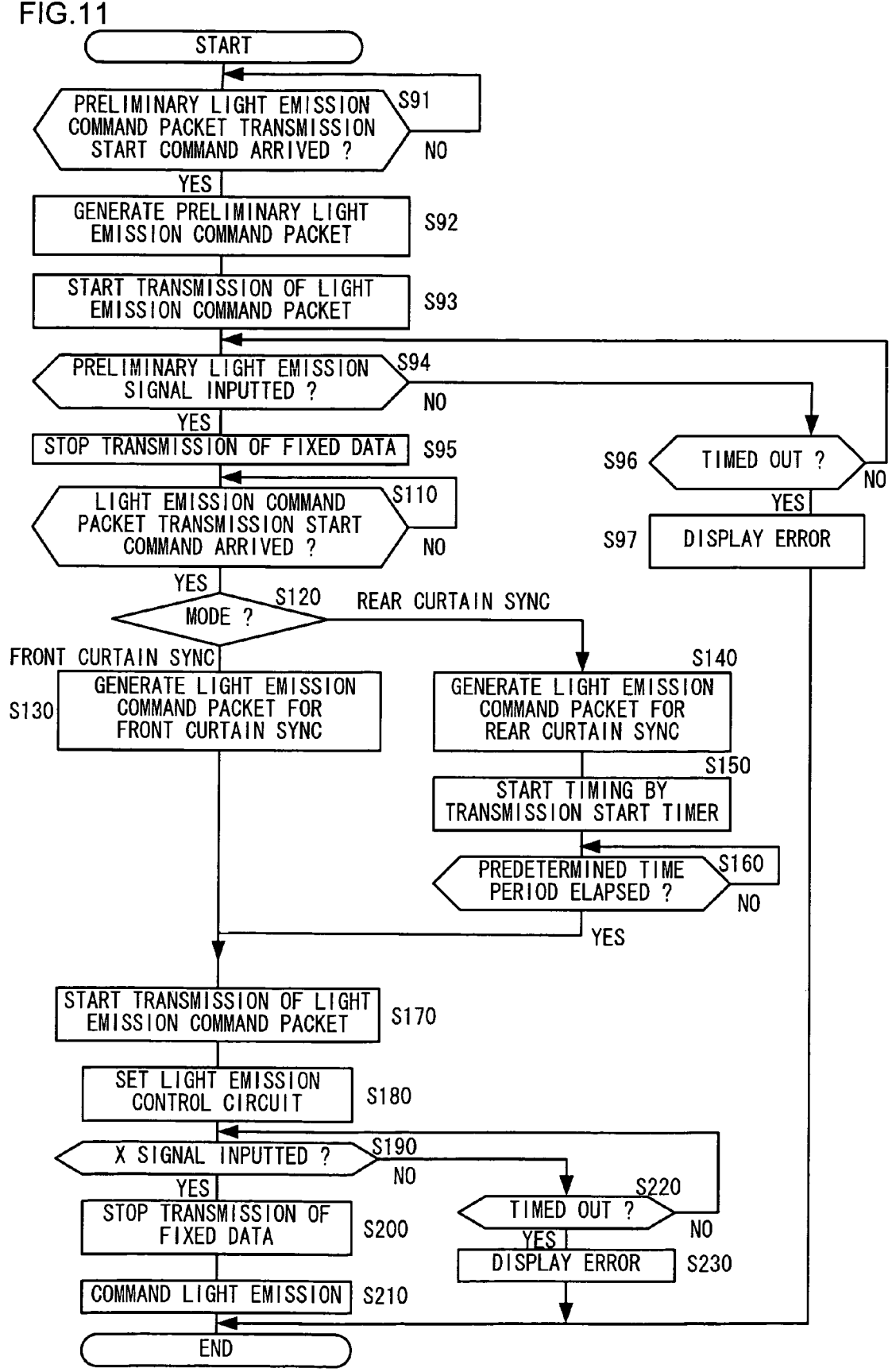
FIG. 11 is a flow chart showing processing executed by the CPU 206*m* of the master electronic flash unit 200, in the first embodiment.

FIG. 11 is a flow chart showing the processing performed by the CPU 206m of the master electronic flash unit 200 in this first embodiment. The processing shown in FIG. 11 is executed as a program that starts when the power supply to the master electronic flash unit 200 is turned on.

In the step S91, the CPU 206m makes a decision as to whether or not a preliminary light emission command packet transmission start command has arrived from the CPU 306 of the camera 300. If it is decided that such a preliminary light emission command packet transmission start command has arrived, then the flow of control proceeds to a step S92, in which the CPU 206m generates a preliminary light emission command packet as shown in FIG. 7D and stores it in the buffer memory 211m, and then the flow of control proceeds to a step S93. In this step S93, the CPU 206m controls the modulation and transmission circuit 203m and starts the transmission of this preliminary light emission command packet that it has generated, and then the flow of control proceeds to a step S94.

In the step S94, a decision is made as to whether or not the above described preliminary light emission signal has been input from the CPU 306 of the camera 300. If it has decided that the preliminary light emission signal has not been input, then the flow of control proceeds to a step S96. In this step S96, a decision is made as to whether or not the processing has timed out, by deciding whether or not a predetermined time period, for example 10 msec, has elapsed from when the preliminary light emission packet transmission start command arrived. If it has been decided that time out has not occurred, then the flow of control returns to the step 94, and the system waits for the input of the preliminary light emission signal until time out occurs. On the other hand, if it has been decided that time out has occurred, then the flow of control proceeds to a step S97, in which an error is displayed upon a monitor not shown in the figures, and then this processing terminates.

By contrast, if it has been decided that the preliminary light emission signal has been input, then the flow of control is transferred to a step S95, in which the modulation and transmission circuit 203m is controlled and the transmission of the packet to the remote electronic flash unit 400 is stopped, in other words the transmission of the fixed data 5i is stopped. Then the flow of control is transferred to a step S110.

In this step S110, the CPU 206m makes a decision as to whether or not a transmission start command has arrived from the CPU 306 of the camera 300. If it has been decided that a transmission start command has arrived, then the flow of control proceeds to a step S120, and a decision is made as to whether the mode that is set by the camera 300 is the front curtain sync mode or the rear curtain sync mode described above. If it is decided that it is the front curtain sync mode, then the flow of control is transferred to a step S130, in which the CPU 206m generates a light emission command packet for the front curtain sync mode, as shown in FIG. 7A or FIG. 7B, and stores it in the buffer memory 211m, and then the flow of control is transferred to a step S170.

By contrast if, in the step S120, it is decided that it is the rear curtain sync mode, then the flow of control is transferred to a step S140. In this step S140, the CPU 206m generates a light emission command packet for the rear curtain sync mode, as shown in FIG. 7C, and then the flow of control is transferred to a step S150. In this step S150, timing by the above described transmission start timer is started, and then the flow of control proceeds to a step S160. In this step S160 a decision is made as to whether or not a predetermined time period has elapsed, on the basis of the value of the transmission start timer. If it has been decided that the predetermined time period has elapsed, then the flow of control proceeds to the step S170.

In the step S170, the modulation and transmission circuit 203m is controlled and the transmission of a light emission command packet is started, and then the flow of control proceeds to a step S180. In this step S180, the light emission control circuit 212*m* is set so as to perform light emission of the amount of emitted light that has been calculated by the CPU 306 of the camera 300, and then the flow of control proceeds to a step S190. In this step S190, a decision is made as to whether or not an X signal has been input from the shutter 302. If it has been decided that an X signal has been input, then the flow of control proceeds to a step S200, and the modulation and transmission circuit 203*m* is controlled and the transmission of the packet to the remote electronic flash unit 400 is stopped, in other words the transmission of the fixed data 5*i* is stopped, and then the flow of control proceeds to a step S210. In this step S210, the light emission control circuit 212*m* is controlled and the xenon tube 213*m* is caused to emit light, and then this processing terminates.

On the other hand, if in the step S190 it has been decided that the X signal has not been input, then the flow of control proceeds to a step S220. In this step S220 a decision is made as to whether or not the processing has timed out, by making a decision as to whether or not a predetermined time period from when the light emission packet transmission start command arrived from the CPU 306, for example 10 msec, has elapsed. If it has been decided that time out has not occurred, then the flow of control returns to the step S190, and the system waits for the input of the X signal until time out occurs. By contrast, if it has been decided that time out has occurred, then the flow of control proceeds to a step S230, in which an error is displayed upon the monitor not shown in the figures, and then this processing sequence terminates.

Figure 12:
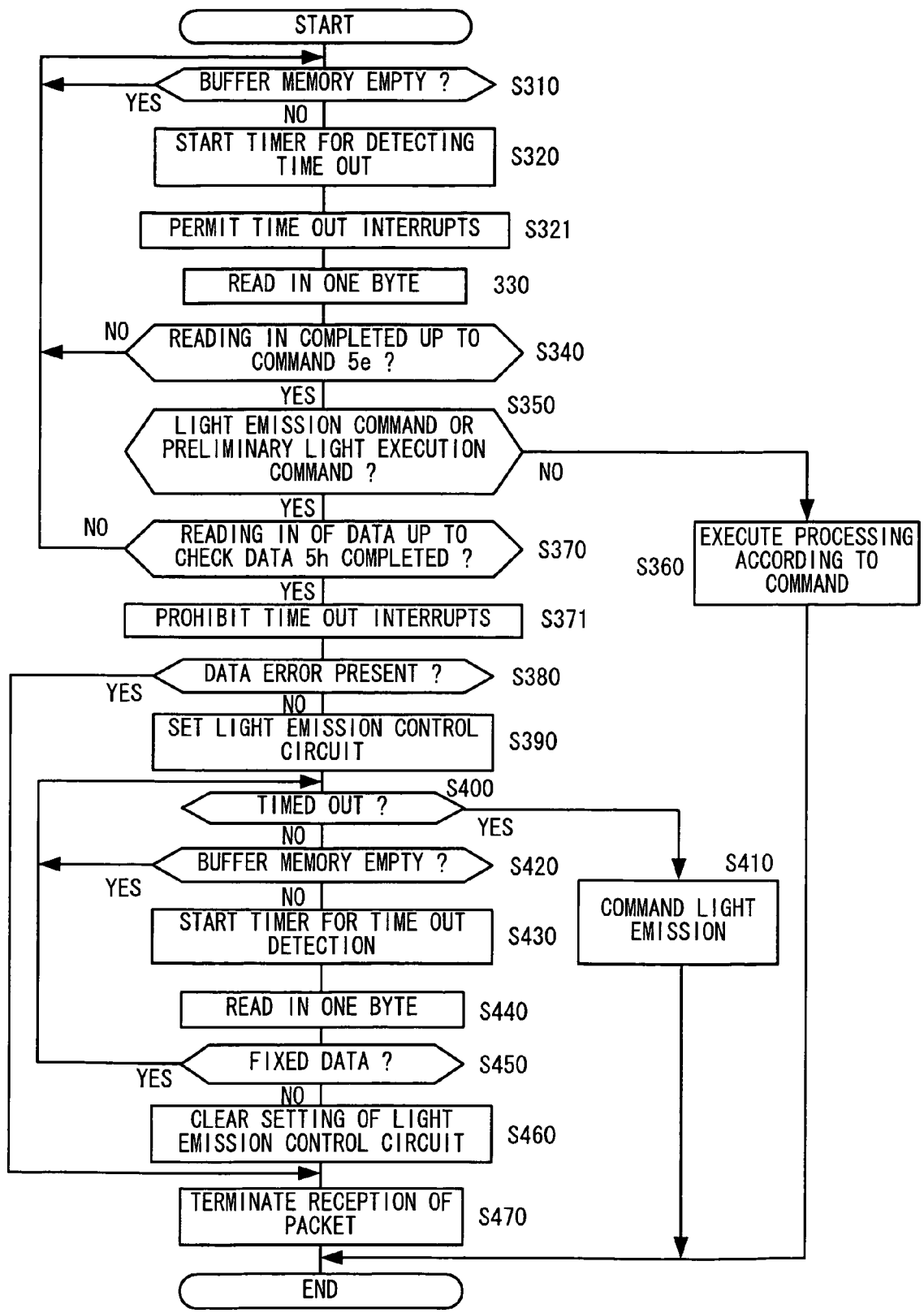
FIG. 12 is a flow chart showing processing executed by the CPU 206*r* of the remote electronic flash unit 200, in the first embodiment.

FIG. 12 is a flow chart showing the processing performed by the CPU 206*r* of the remote electronic flash unit 400 in this first embodiment. The processing shown in FIG. 12 is executed as a program that starts when, as described above, it has been detected that input of the interrupt signal from the detector 205*r* has occurred.

In a step S310, the CPU 206*r* makes a decision as to whether or not the buffer memory 207*r* is empty. If it has decided that the buffer memory 207*r* is not empty, then the flow of control proceeds to a step S320, and timing by a timer for detecting time out is started. Then the flow of control proceeds to a step S321, in which time out interrupts are permitted. Due to this, it becomes possible for time out interrupt processing that will be described hereinafter with reference to FIG. 13 to be executed, when the timer for detecting time out whose timing was started in the step S320 reaches a predetermined time out period. It should be understood that, as this time out period, a time period, for example 18 μsec, is set that is obtained by adding a certain extra time to the time period that the CPU 206*r* requires for reading in one byte of data. Thereafter the flow of control proceeds to a step S330. In this step S330, the CPU 206*r* reads in one byte of data from the buffer memory 207*r*, and then the flow of control proceeds to a step S340.

In the step S340, the CPU 206*r* makes a decision as to whether or not the reading in of data, among the data included in the packet, has been completed up to the command 5*e*. If it has been decided that the reading in of data up to the command 5*e* has not yet been performed, then the flow of control returns to the step S310 and the reading in of data is continued. By contrast, if it has been decided that the reading in of data up to the command 5*e* has been completed, then the flow of control proceeds to a step S350. In this step S350, a decision is made as to whether or not the command 5*e* that has been read in is a light emission command for commanding light to be emitted. If it has been decided that this command is not a light emission command, then the flow of control proceeds to a step S360 in which processing is executed according to this command, and then this processing terminates.

By contrast, if it has been decided that a light emission command has been received, then the flow of control is transferred to a step S370. In this step S370, the CPU 206*r* makes a decision as to whether or not, among the data included in the packet, reading in of data has been completed up to the check data 5*h*. If it has been decided that the reading in of data has not been completed up to the check data 5*h*, then the flow of control returns to the step S310 and the reading in of data is continued. By contrast, if it has been decided that the reading in of data has been completed up to the check data 5*h*, then the flow of control proceeds to a step S371. In this step S371, the time out interrupts that were permitted in the step S321 are prohibited, and then the flow of control proceeds to a step S380.

In the step S380, a decision is made as to whether or not the result of performing a check using the check data 5*h* is that there is an error in the data. If it has been decided that there is an error in the data, then the flow of control is transferred to a step S470 that will be described hereinafter. By contrast, if it is decided that there is no error in the data, then the flow of control proceeds to a step S390. In this step S390, the light emission control circuit 212*r* is set so as to perform emission of an amount of light as set by the parameter 5*g* that is included in the packet, over the time period for light emission included therein, and then the flow of control proceeds to a step S400.

In this step S400, a decision is made as to whether or not the value of the timer for time out detection, the timing by which was started in the step S430, has yet arrived at the predetermined time out period; i.e., it is decided whether or not the processing has timed out. If it has been decided that time out has occurred, then the flow of control proceeds to a step S410. In this step S410, it is decided that the transmission of the fixed data 5*i* from the master electronic flash unit 200 has stopped, in other words that the state of the packet transmission from the master electronic flash unit 200 has changed, and this timing is detected as being the light emission timing. And the light emission control circuit 212*r* is controlled and the xenon tube 213*r* is caused to emit light, and then this processing terminates.

On the other hand, if it has been decided in the steps 400 that time out has not taken place, then the flow of control proceeds to a step S420. In this step S420, the CPU 206*r* makes a decision as to whether or not the buffer memory 207*r* is empty. If it has been decided that the buffer memory 207*r* is empty, then the flow of control returns to the step S400. By contrast, if it has been decided that the buffer memory 207*r* is not empty, then the flow of control proceeds to a step S430, in which the timing by the timer for time out detection is restarted. Thereafter the flow of control proceeds to a step S440, in which one byte of data is read in from the buffer memory 207*r*, and then the flow of control proceeds to a step S450.

In the step S450, the CPU 206*r* makes a decision as to whether or not the data that has been read in is the fixed data 5*i*. If it has been decided that this data is the fixed data 5*i*, then the flow of control returns to the step S400 and the processing above is repeated. By contrast, if it is decided that it is not the fixed data 5*i*, then the flow of control proceeds to a step S460. In this step S460, since the fixed data 5*i* has not been received even though, as shown in FIGS. 7A through 7D, the fixed data 5*i* is included in the light emission command packet after the check data 5*h*, accordingly it is decided that an error has occurred and the setting of the light emission control circuit 212*r* is cleared. Thereafter the flow of control proceeds to a step S470, in which the reception of the packet is terminated (aborted), and then this processing terminates.

Figure 13:
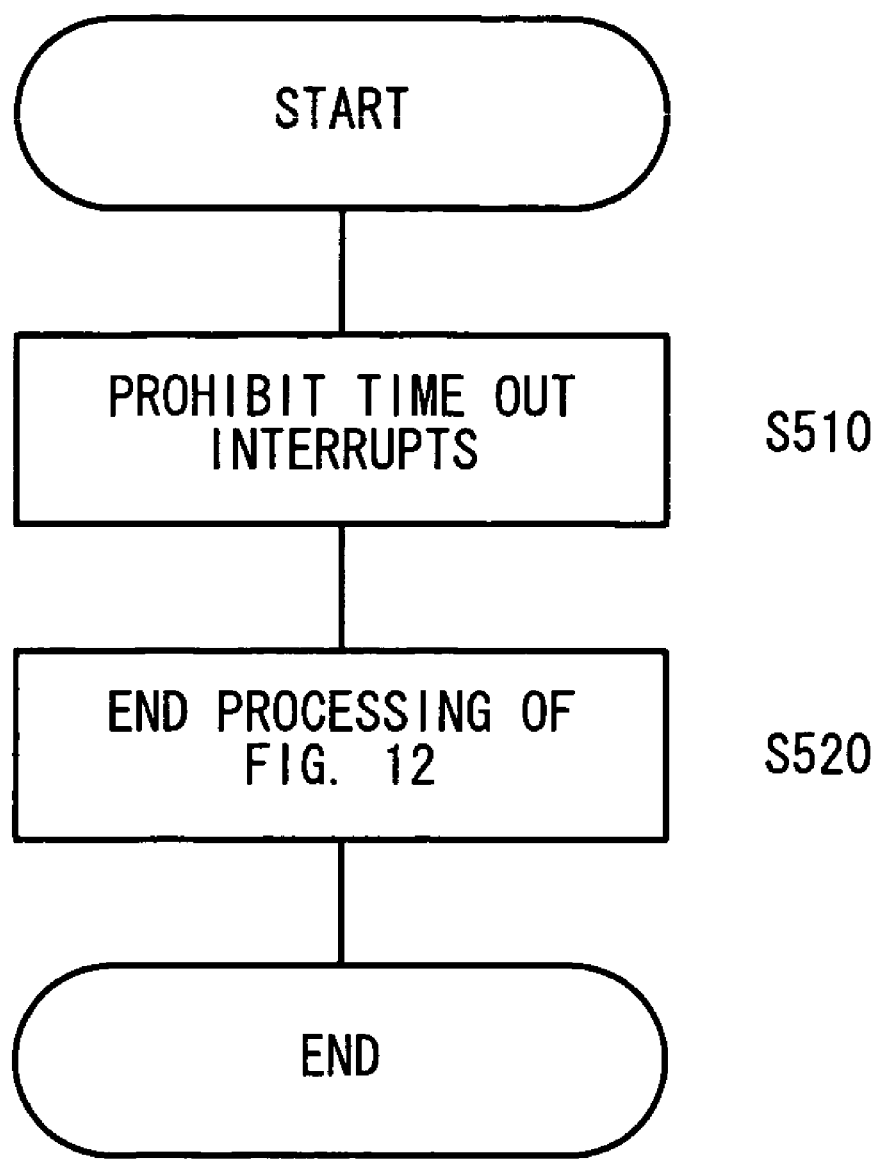
FIG. 13 is a flow chart showing timeout interrupt processing.

FIG. 13 is a flow chart showing the flow of time out interrupt processing that is executed from when time out interrupt is permitted in the step S321 of FIG. 12 described above, to the prohibition thereof in the step S371. The processing shown in FIG. 13 is executed as a program that is started by the CPU 206r when the processing has timed out, due to the timer for time out detection, the timing of which was started in the step S320, reaching the predetermined time out period described above while time out interruption is being permitted.

In a step S510, the time out interrupt that was permitted in the step S321 is prohibited. Due to this, it is possible to prevent a further time out interrupt from being performed during the execution of time out processing. Then the flow of control proceeds to a step S520, and the processing of FIG. 12 described above is stopped. Then this processing sequence terminates.

Figure 14:
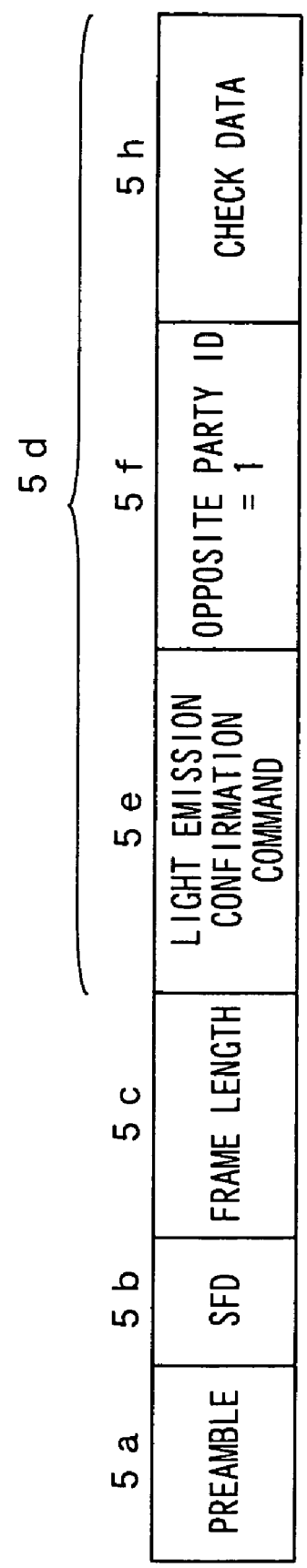
FIG. 14 is a figure showing a concrete example of a light emission confirmation packet.

It should be understood that, in this embodiment, the CPU 206m of the master electronic flash unit 200 generates and transmits to each of the remote electronic flash units 400a light emission confirmation packet, as for example shown in FIG. 14, in order to cause them, after the light emission has been completed, to report the state of affairs during the emission of light. In these light emission confirmation packets, the command 5e is a light emission confirmation command. Moreover, since one of these light emission confirmation commands is transmitted individually to each of the remote electronic flash units 400, accordingly an example is shown in which the remote electronic flash unit 400 number "1" is taken as the subject, and "1" is set as the opposite party ID 5f.

It should be understood that, since it is not necessary for any agreement to be imposed between the execution timings of the light emission confirmation commands in the camera 300 or the master electronic flash unit 200 and the remote electronic flash units 400, accordingly no fixed data 5i is included in this light emission confirmation packet. Moreover, the parameter 5g is also not included, since there is no parameter to be transferred to the remote electronic flash unit 400.

Figure 15:
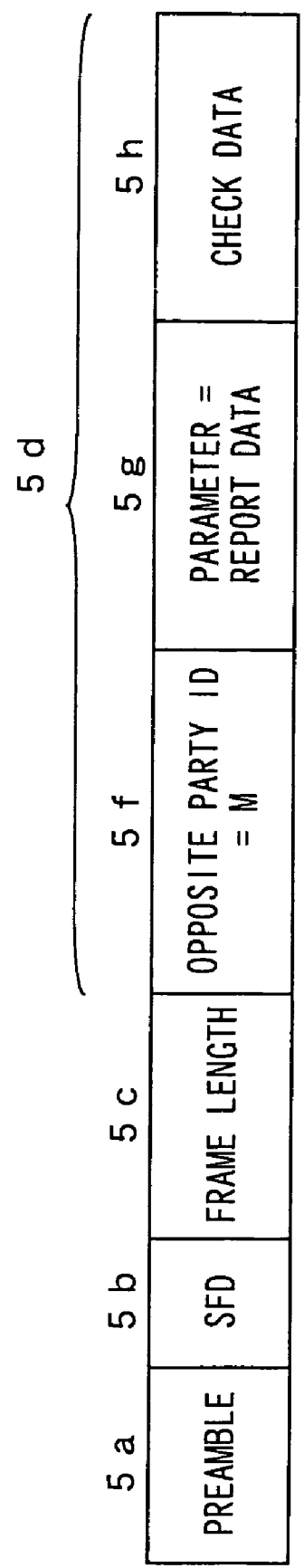
FIG. 15 is a figure showing a concrete example of a report packet.

The CPU 206r of each remote electronic flash unit 400 that receives such a light emission confirmation packet creates a report packet as, for example, shown in FIG. 15, and thereby reports the state of affairs during its emission of light to the master electronic flash unit 200. This report packet includes report data, that is information specifying to the master electronic flash unit 200 what was the state of affairs light during the emission of light. As this report data, for example, (1) information that specifies that full light emission was performed, since the amount of light to be emitted (the target light amount) that was set by the parameter 5g in the light emission command was greater than the amount of light that could be emitted by this remote electronic flash unit 400, or the like, may be reported. Moreover, it would also be acceptable to arrange to report (2) information related to the difference between a target light amount for this emission of light and the actual amount of light that was emitted.

It should be understood that this report packet is a packet for transmitting the report data from the remote electronic flash unit 400 to the master electronic flash unit 200, and no command 5e is included in this packet, since it is not a packet for commanding any processing to be executed. Moreover, an ID that designates the master electronic flash unit 200 is specified as the opposite party ID 5f; for example, "M" may be specified. And no fixed data 5i is included in this report packet either, since it is not necessary for any agreement to be imposed between the execution timings of processing by the master electronic flash unit 200 and the remote electronic flash units 400.

According to the first embodiment as explained above, the following beneficial operational effects may be obtained.

(1) When the CPU 206m of the master electronic flash unit 200 has input the X signal from the CPU 306 of the camera 300, it is arranged for it to notify the light emission timing to the remote electronic flash unit 400 by changing the state of packet transmission to the remote electronic flash unit 400. Due to this, it is possible to make the light emission timing of the remote electronic flash unit 400, that is wirelessly connected, agree with the light emission timing of the master electronic flash unit 200 and the photographic timing of the camera 300.

(2) It is arranged for the CPU 206m of the master electronic flash unit 200 to change the state of packet transmission by stopping the transmission of the fixed data 5i that is appended at the end of the packet. Due to this, on the side of the remote electronic flash unit 400, merely by monitoring the reception state of data, it is possible to simplify the processing when the light emission timing has been detected.

(3) Furthermore, it is arranged for the CPU 206m of the master electronic flash unit 200 to change the state of packet transmission by changing the data pattern of the fixed data 5i that is appended at the end of the packet. Due to this, on the side of the remote electronic flash unit 400, it is possible to detect the light emission timing only by monitoring the data pattern of the data that is received, so that it is possible to simplify the processing.

(4) It is arranged for the CPU 206m of the master electronic flash unit 200 to include the command 5e in the packet, as command data for commanding the remote electronic flash unit 400 to perform processing related to photography. Due to this, it is possible to command the details of a command to be executed, by using the packet from transmission of the command to the remote electronic flash unit 400. In other words, it is also possible to notify a light emission command to the remote electronic flash unit 400, by using a light emission command packet in which a light emission command is included for commanding the remote electronic flash unit 400 to perform light emission.

(5) Furthermore, both in the case of the front curtain sync mode and also in the case of the rear curtain sync mode, it is arranged for the CPU 206m of the master electronic flash unit 200 to change the light emission command packet transmission start timing. Due to this, it is possible to start the transmission of the light emission command packet at the optimum timing, according to the mode. For example, since the light emission timing is delayed more in the case of the rear curtain sync mode than in the case of the front curtain sync mode, if the transmission of the packet were to be started at the same timing as in the front curtain sync mode, then the data length of the fixed data 5i would become undesirably long. However, by delaying the packet transmission start timing during the rear curtain sync mode later than during the front curtain sync mode, it is possible to reduce the data length of the fixed data 5i that is transmitted, and thereby it is possible to reduce the communication load.

(6) In the packet that is transmitted and received, it is arranged to include the check data 5h after the command 5e and before the fixed data 5i. It is necessary to include the check data 5h before the fixed data 5i, because it is necessary to stop the transmission at the timing for the start of light emission commanded by the fixed data 5i. Moreover, since the check data 5h is for checking errors in the data, accordingly it is desirable to store it as late as possible in the packet.

By taking these considerations into account, and by therefore including the check data 5h after the command 5e and before the fixed data 5i, it is possible to decide whether or not the data that is included before the check data 5h is correct.

(7) It is arranged, after the light emission has been completed, for light emission confirmation packets to be transmitted from the master electronic flash unit 200 to the remote electronic flash units 400, in order to cause each of the remote electronic flash units 400 to report the state of affairs during its emission of light. Due to this, the master electronic flash unit 200 and the camera 300 are able to ascertain the state of affairs during the emission of light by each of the remote electronic flash units 400.

(8) As the opposite party ID 5f that is included in the packet, it is arranged for it to be possible to set either an individual ID for designating one of the remote electronic flash units 400 individually, or the all-device ID for designating these devices all together. Due to this, if packets with the same contents are to be transmitted to all of the remote electronic flash units 400, then it is possible to designate the all-device ID, and to transmit these packets all together.

(9) It is arranged for it to be possible to include a plurality of opposite party IDs 5f in a single packet, so that it is possible to set the individual IDs of various remote electronic flash units 400 herein, and to set an individual parameter 5g for each of these individual IDs. Due to this, even if the details of the parameters 5g to be transmitted to the various remote electronic flash units 400 are different, it is still possible to transmit this information in a single packet, so that it is possible to reduce the communication load.

Embodiment Two

In the first embodiment described above, it was arranged to command the emission of light by transmitting a light emission command packet from the master electronic flash unit 200 to the remote electronic flash unit 400. And, during the front curtain sync mode, data is included in the parameter 5g in this light emission command packet for designating the amount of light to be emitted by the remote electronic light emission device 400. Moreover, during the rear curtain sync mode, data is included in the parameter 5g for designating the amount of light to be emitted by the remote electronic light emission device 400, and data is included for designating a time period for the light emission to be continued, that specifies a time period during that it is necessary to keep on emitting light.

By contrast, in the second embodiment, the CPU 206m of the master electronic flash unit 200, before commanding the emission of light by transmitting the light emission command packet described above, generates and transmits a light emission gain packet that includes data for notifying the remote electronic flash unit 400, in advance, of the amount of light to be emitted and the time period for this emission of light to be continued. And data relating to the amount of light to be emitted and the time period for this emission of light to be continued is not included in the subsequent light emission command packet that is transmitted.

In the remote electronic flash unit 400, at the stage that this light emission gain packet is received, the CPU 206r sets the light emission control circuit 212r on the basis of the amount of light to be emitted and the time period for this emission of light to be continued that are included in this light emission gain packet. And, in a similar manner to the first embodiment, the timing at which change is detected of the state of reception of the subsequently received light emission command packet, is detected as being the light emission timing, and the light emission control circuit 212r is commanded to perform light emission. It should be understood that since, in this second embodiment, FIGS. 1 through 6 and FIGS. 8, 9, and 13 through 15 are the same as in the first embodiment, explanation thereof will be omitted.

FIG. 16A is a figure showing a concrete example of a light emission gain packet during the front curtain sync mode, for notifying the necessary information for light emission to the remote electronic flash unit 400, in other words for notifying the unit 400 of the amount of light to be emitted. This light emission command packet consists of the above described preamble 5a, SFD 5b, frame length 5c, and data 5d. Here, the explanation will focus upon the points of difference from the light emission command packet in the first embodiment described above.

With the light emission gain packet shown in FIG. 16A, a light emission gain command is set as command data in the command 5e, for commanding the remote electronic flash unit 400 to set the light emission control circuit 212r to prepare for light emission. And, as the parameter 5g, data is designated that specifies the amount of emitted light to be used for setting the light emission control circuit 212r. It should be understood that, by setting the all-device ID="0" as the opposite party ID 5f in this light emission gain packet, the same amount of emitted light is commanded to all of the remote electronic flash units 400. Moreover, since this is a packet for notifying the amount of emitted light to the remote electronic flash units 400, no fixed data 5i is included for making the start timings of processing match one another.

FIG. 16B is a figure showing a concrete example of a light emission gain packet during the rear curtain sync mode, for notifying the necessary information for light emission to the remote electronic flash unit 400, in other words for notifying the unit 400 of the amount of light to be emitted. With this FIG. 16B as well, the explanation will focus upon the points of difference from the light emission command packet in the first embodiment described above.

With the light emission gain packet shown in FIG. 16B, a light emission gain command is set as command data in the command 5e, in the same way as in the case of FIG. 16A. And, as the parameter 5g, data that specifies the amount of emitted light to be used for setting the light emission control circuit 212r, and also data that specifies the time period for the light emission to be continued, are designated. It should be understood that, by setting the all-device ID="0" as the opposite party ID 5f in this light emission gain packet, the same amount of emitted light and the same period for light emission to be continued are commanded to all of the remote electronic flash units 400. Moreover, in this case as well, no fixed data 5i is included.

And FIG. 16C is a figure showing a concrete example of a light emission command packet, for commanding the remote electronic flash unit 400 to perform emission of light. With this FIG. 16C as well, the explanation will focus upon the points of difference from the light emission command packet in the first embodiment described above.

Here, since the amount of light to be emitted and the time period for this light emission to be continued have already been notified to the remote electronic flash unit 400 by transmitting the light emission gain packet described above, this information is not included in the light emission command packet shown in FIG. 16c. In other words, the CPU 206m generates a light emission command packet in which no parameter 5g is included.

It should be understood that, in this second embodiment, since the amount of light to be emitted and the time period for this light emission to be continued are notified to the remote electronic flash unit 400 before the transmission of the light emission command packet, accordingly it would also be acceptable to arrange to send the light emission command packet to the remote electronic device 400 directly before commanding the emission of light. In other words, if the remote electronic flash unit 400 were to set the light emission control circuit 212r at the stage that the light emission gain packet is received, then it would be possible to cause light to be emitted as soon as the light emission command packet is received, directly before the light emission timing.

By doing this, in the case of the rear curtain sync mode, it would be acceptable to arrange for the CPU 206m to generate, as the light emission command packet, a packet like the one shown in FIG. 16D, in which no fixed data 5i is included. In the remote electronic flash unit 400, upon receipt of this light emission command packet, the CPU 206r responds to this light emission command packet that it has received, and performs light emission so that the amount of light to be emitted and the time period for this light emission to be continued become those that have been set in advance. By doing this, in the rear curtain sync mode, it is possible for the remote electronic flash unit 400 to perform light emission at a light emission timing that is similar to that when the fixed data 5i is employed.

Figure 17:
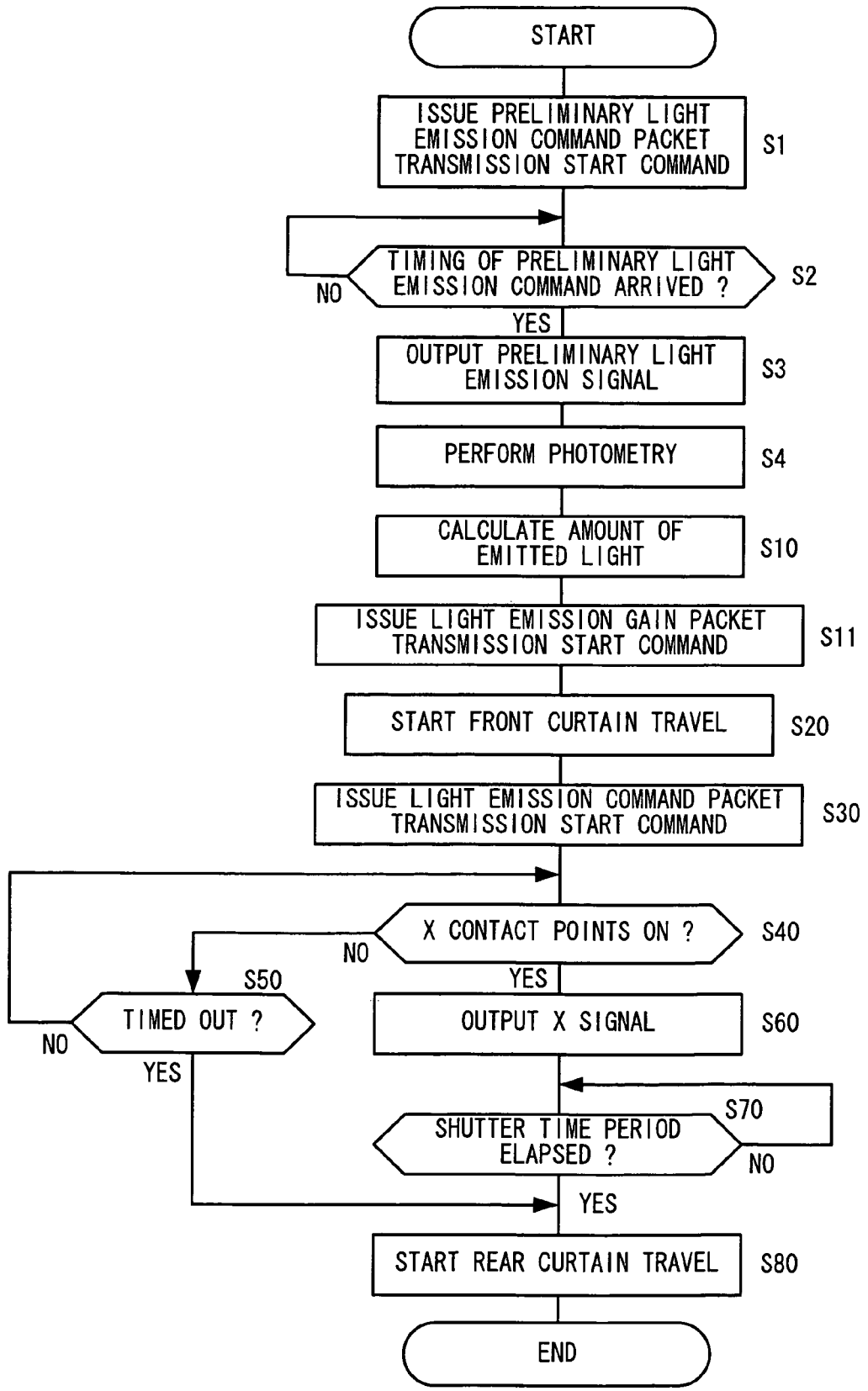
FIG. 17 is a flow chart showing processing executed by a CPU 306 of a camera 300 according to the second embodiment.

FIG. 17 is a flow chart showing processing that is executed by the CPU 306 of the camera 300 in this second embodiment. The processing shown in FIG. 17 is executed as a program that starts when it has been detected that the release switch 307 has been depressed by the user. It should be understood that, in FIG. 17, to processing steps that are the same as processing steps shown in FIG. 10 for the first embodiment, the same step numbers are appended, and the explanation thereof will be omitted; so that the explanation will focus upon the points of difference.

In a step S11, the CPU 306 commands the CPU 206m of the master electronic flash unit 200 to start the transmission of a light emission gain packet. The amount of light to be emitted and the time period for this light emission to be continued, that have been calculated at this time, are also output to the CPU 206m of the master electronic flash unit 200.

Figure 18:
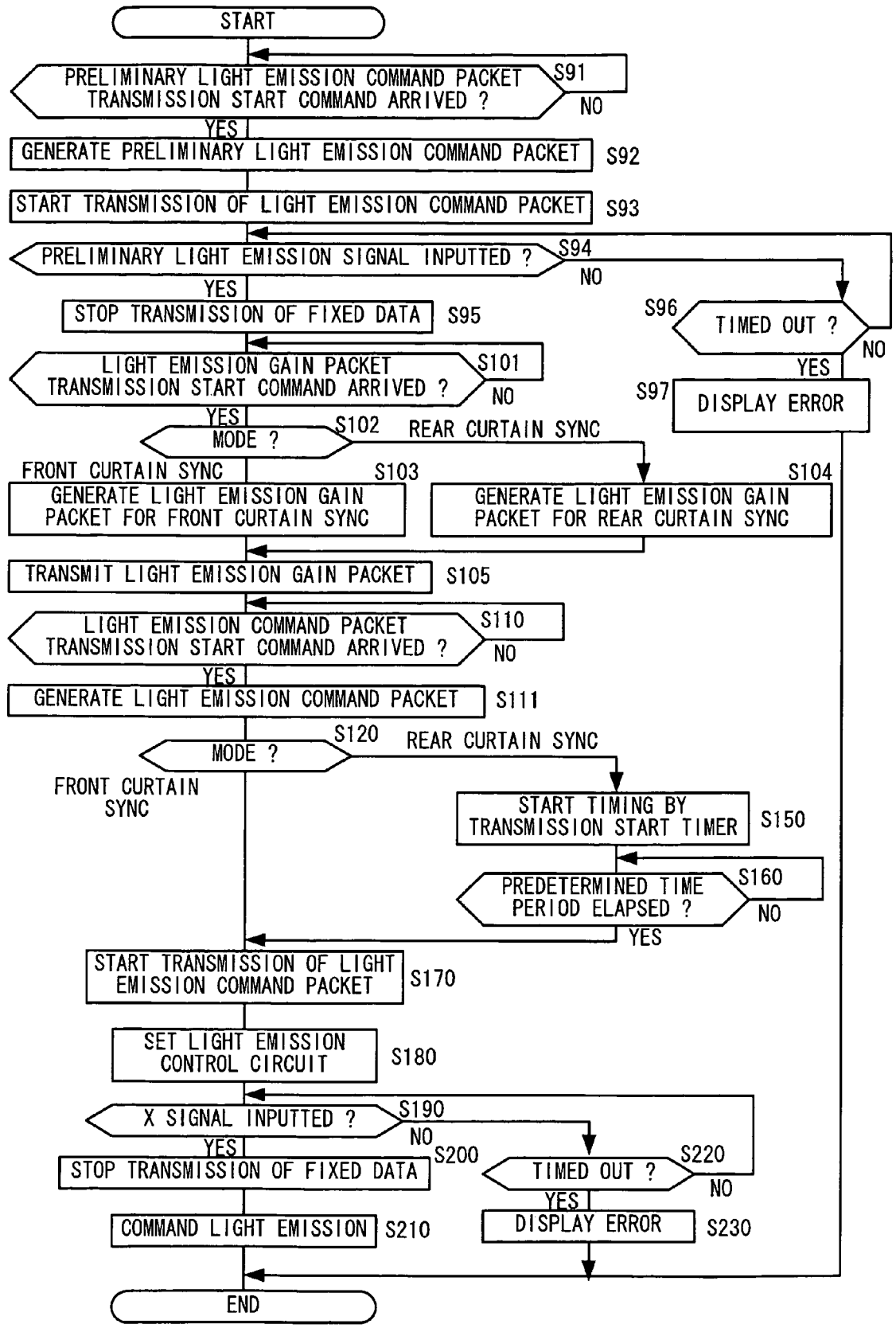
FIG. 18 is a flow chart showing processing executed by a CPU 206*m* of a master electronic flash unit 200, in the second embodiment.

FIG. 18 is a flow chart showing processing that is executed by the CPU 206m of the master electronic flash unit 200 in this second embodiment. The processing shown in FIG. 18 is executed as a program that starts when the power supply of the master electronic flash unit 200 is turned on. It should be understood that, in FIG. 18, to processing steps that are the same as processing steps shown in FIG. 11 for the first embodiment, the same step numbers are appended, and the explanation thereof will be omitted; so that the explanation will focus upon the points of difference.

In a step S101, the CPU 206m makes a decision as to whether or not a light emission gain packet transmission start command has arrived from the CPU 306. If it has been decided that such a transmission start command has arrived, then the flow of control proceeds to a step S102, in which a decision is made as to whether the mode to which the camera 300 is set is the front curtain sync mode or the rear curtain sync mode, described above. If it has been decided in this step S102 that the set mode is the front curtain sync mode, then the flow of control proceeds to a step S103, in which the CPU 206m generates a light emission gain packet for the front curtain sync mode as shown in FIG. 16A and stores it in the buffer memory 211m, and then the flow of control is transferred to a step S105.

By contrast, if it has been decided in the step S102 that the set mode is the rear curtain sync mode, then the flow of control proceeds to a step S104. In this step S104, the CPU 206m generates a light emission gain packet for the rear curtain sync mode as shown in FIG. 16B and stores it in the buffer memory 211m, and then the flow of control proceeds to the step S105. In this step S105, the modulation and transmission circuit 203 m is controlled, and the light emission gain packet that has been generated is transmitted to the remote electronic flash unit 400. Then the flow of control is transferred to the step S110.

And when, in the step S110, the CPU 206m has decided that a light emission command packet transmission start command has arrived from the CPU 306 of the camera 300, then the flow of control proceeds to a step S111, in which a light emission command packet as shown in FIG. 16C is generated, and is stored in the buffer memory 211m.

Figure 19:
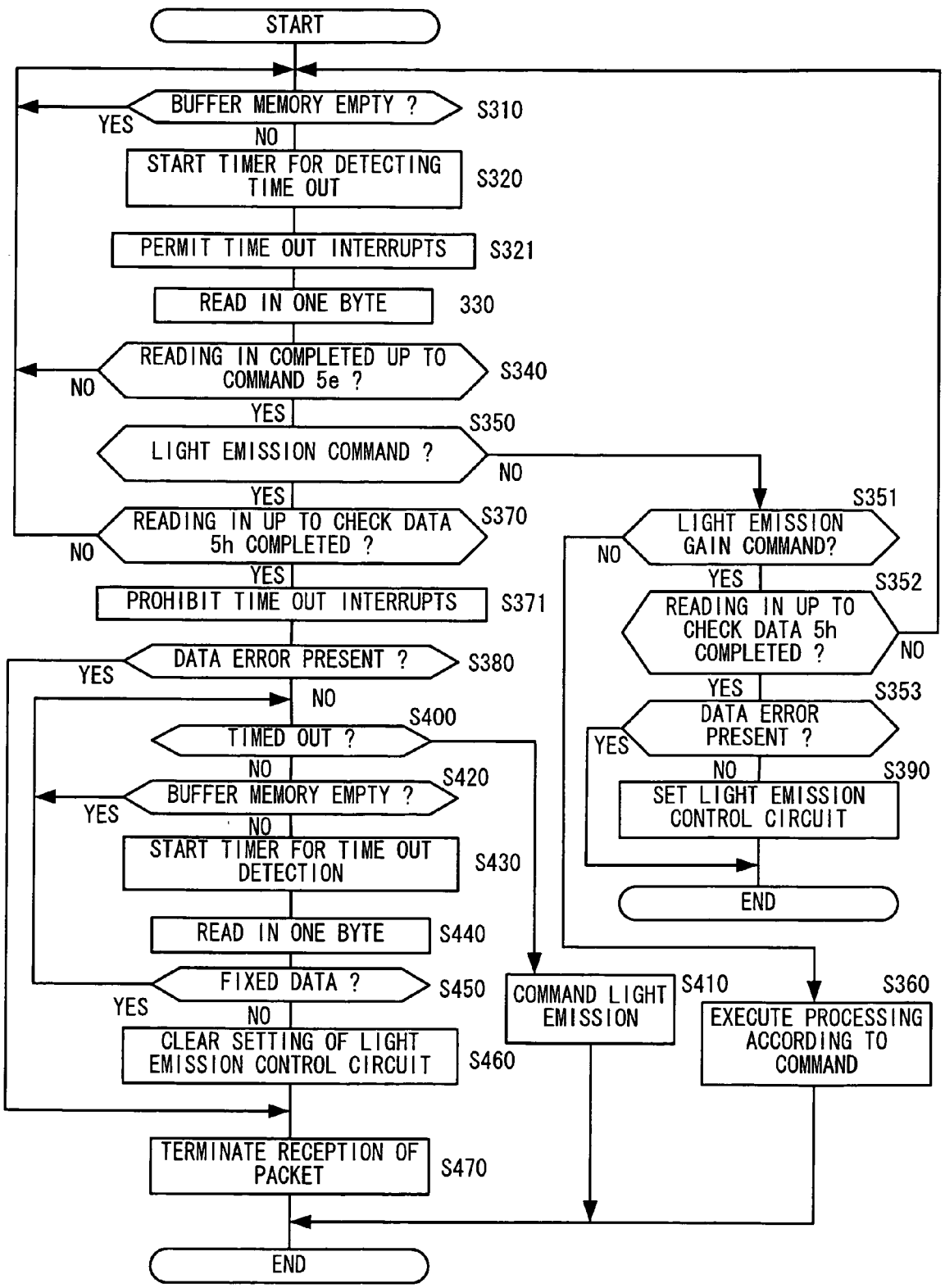
FIG. 19 is a flow chart showing processing executed by a CPU 206*r* of a remote electronic flash unit 200, in the second embodiment.

FIG. 19 is a flow chart showing processing that is executed by the CPU 206r of a remote electronic flash unit 400 in this second embodiment. The processing shown in FIG. 19 is executed as a program that starts when, as described above, it has been detected that an interrupt signal has been input from the detector 205r. It should be understood that, in FIG. 19, to processing steps that are the same as processing steps shown in FIG. 12 for the first embodiment, the same step numbers are appended, and the explanation thereof will be omitted; so that the explanation will focus upon the points of difference.

If in the step S350 it is decided that the command 5e that has been read in is not a light emission command, then the flow of control proceeds to a step S351. In this step S351, the CPU 206r makes a decision as to whether or not the command 5e that has been read in is a light emission gain command. If it has been decided that the command 5e that has been read in is a light emission gain command, then the flow of control is transferred to the step S360. By contrast, if it is decided that this is not a light emission gain command, then the flow of control proceeds to a step S352.

In the step S352, the CPU 206r makes a decision as to whether or not, among the data included in the packet, the reading in of data has been completed up to the check data 5h. If it has been decided that the reading in of data has not been performed up to the check data 5h, then the flow of control returns to the step S310 and the reading in of data is continued. By contrast, if it has been decided that the reading in of data has been performed up to the check data 5h, then the flow of control proceeds to a step S353.

In the step S353, a decision is made as to whether or not the result of performing checking upon the data using the check data 5h is that there is an error in the data. If it has been decided that there is an error in the data, then this processing terminates. By contrast, if it has been decided that there is no error in the data, then the flow of control is transferred to the step S390. In this step S390, the light emission control circuit 212r is set so as to perform light emission with the amount of light to be emitted and the time period for the emission of light to be continued that are set by the parameter 5g that is included in the light emission gain packet, and then this processing terminates.

According to the second embodiment as explained above, in addition to the beneficial operational effects of the first embodiment, it is also possible to obtain the following further beneficial effects.

(1) It is arranged to transmit the light emission gain packet to the remote electronic flash unit 400 and to notify the amount of light to be emitted and the time period for the emission of light to be continued to the remote electronic flash unit 400 in advance, and subsequently to transmit the light emission command packet and to command light emission. Due to this, it is possible to suppress delay of the data due to the data capacity of the light emission command packet being small, so that it is possible thereby to enhance the accuracy with which the start timings of the processing by the master electronic flash unit 200 and the camera 300 are made to agree with one another.

(2) In the case of the rear curtain sync mode, it is arranged for the CPU 206m to generate a packet that does not include any fixed data 5i (timing data) as the light emission command packet, as shown in FIG. 16D, and for this light emission command packet to be transmitted to the remote electronic flash unit 400 before the start of the travel of the rear curtain of the shutter 302. And in the remote electronic flash unit 400, in response to this light emission command packet, it is arranged for the CPU 206r to perform emission of light so that the amount of light emitted and the time period over which the emission of light is continued become equal to the values that have been set in advance. Due to this, in the case of the trailing sync mode, it is possible to reduce the communication load, since it becomes unnecessary to transmit the fixed data 5i continuously.

Variant Embodiments

It should be understood that the light emission control systems of the embodiments described above may also be varied in the following ways.

Figure 20:
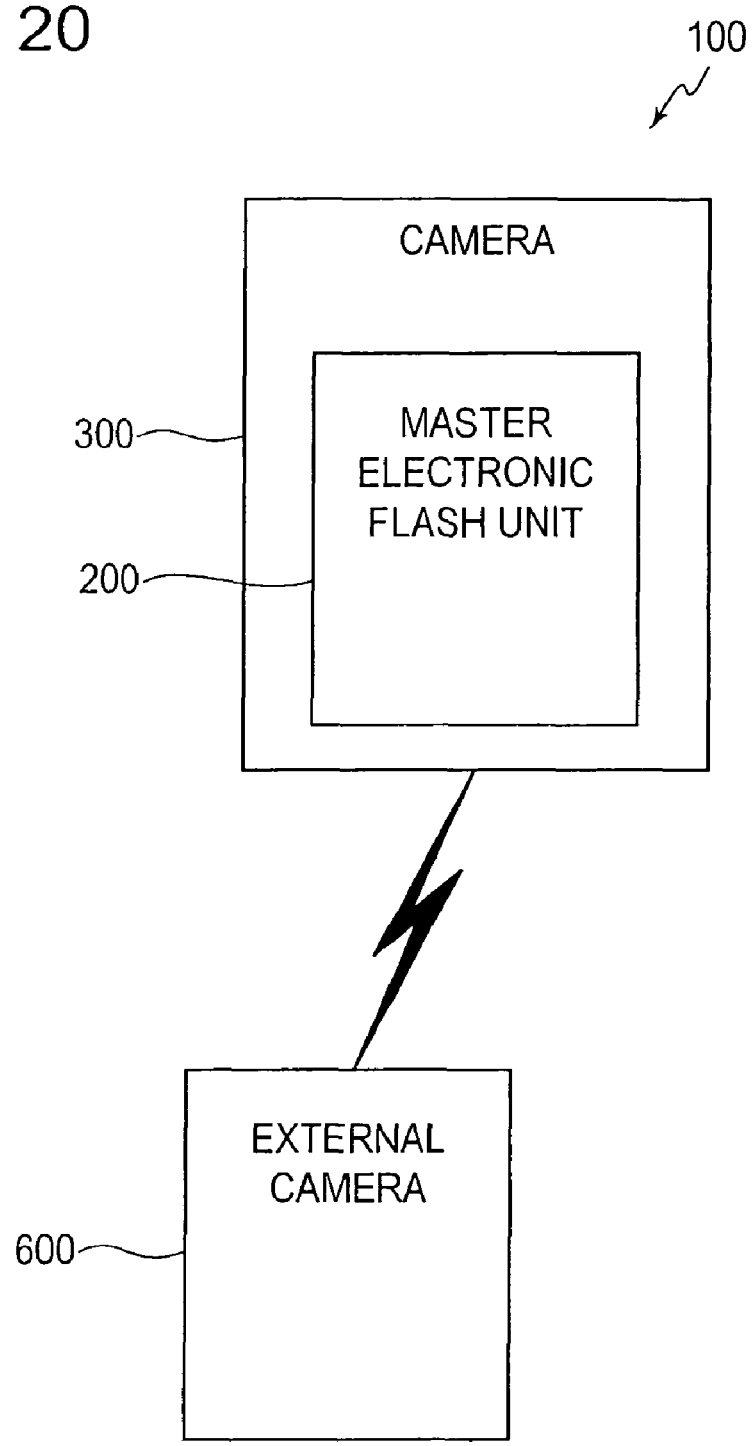
FIG. 20 is a block diagram showing the structure of an embodiment of a light emission control system.

(1) In the first and second embodiments described above, examples were explained in which the external device was an electronic flash unit 400, and the light emission timing of the master electronic flash unit 200, the timing at which the camera 300 opened the shutter 302, and the light emission timing of the remote electronic flash unit 400 were made to match one another. However, it would also be possible to employ a camera (an external camera 600) as the external device, as illustrated in FIG. 20. In this case, the light emission timing of the master electronic flash unit 200, the timing at which the camera 300 opens the shutter 302, and the timing at which the camera that is the external device opens its shutter 302, would be made to match one another; so that, thereby, it is made possible for a plurality of cameras to photograph the same photographic subject.

(2) In the first and second embodiments described above, examples were explained in which, between the camera 300 to which the master electronic flash unit 200 that was equipped with a wireless module and the remote electronic flash unit 400, the timing at which the camera 300 opened its shutter 302, the light emission timing of the master electronic flash unit 200, and the light emission timing of the remote electronic flash unit 400, were made to agree with one another. However, if no master electronic flash unit is mounted to the camera 300, but it is equipped only with a wireless module, then, according to the present invention, it would be possible to make the timing at which the camera 300 opens its shutter 302 and the light emission timing of the remote electronic flash unit 400 agree with one another. In this case, the camera 300 may have a function of transmission of the packet of the master electronic flash unit 200 described above, that is an information communication function. The camera 300 itself may be termed an information communication device.

(3) In the first and second embodiments described above, examples were explained in which the master electronic flash unit 200 and the remote electronic flash unit 400 incorporated wireless modules. However, it would also be possible to arrange for the wireless modules to be fittable to and removable from the master electronic flash unit 200 and the remote electronic flash unit 400. Moreover, while examples have been explained in which the master electronic flash unit 200 was mounted to the camera 300, and a wireless module was mounted to the master electronic flash unit 200, it would also be acceptable to mount a wireless module upon the camera 300, and, in this case, it would be acceptable to arrange for this wireless module to be housed internally to the camera 300, or alternatively for it to be fittable and removable to the camera 300.

The above described embodiments are examples, and various modifications can be made without departing from the scope of the invention.

What is claimed is:

1. An information communication device, comprising:
    a packet generation unit that generates a packet including a plurality of sets of data containing a set of data constituted with repetition of a predetermined data pattern at an end of the packet, the set of data at the end of the packet specifying to an external device a start timing for processing related to photography;
    a transmitting unit that transmits the packet to the external device by wireless communication; and
    a transmission control unit that changes a state of transmission of the set of data at the end of the packet by the transmitting unit according to a start timing of the processing related to photography.

2. An information communication device according to claim 1, wherein
    the transmission control unit changes the state of transmission of the set of data by stopping a transmission of the set of data according to the start timing of the processing related to photography.

3. An information communication device according to claim 1, wherein
    the transmission control unit changes the state of transmission of the set of data by changing the predetermined data pattern of the set of data according to the start timing of the processing related to photography.

4. An information communication device according to claim 1, wherein
    the packet generation unit generates the packet while including, before the set of data, command data for commanding the external device to execute the processing related to photography.

5. An information communication device according to claim 4, wherein:
    the external device is an electronic flash unit; and
    the command data is data for commanding the electronic flash unit to perform emission of light.

6. An information communication device according to claim 5, wherein:
    the information communication device is a camera; and
    the packet generation unit generates the packet that includes, before the set of data, data that specifies a time period over which a shutter of the camera is fully opened.

7. An information communication device according to claim 1, wherein:
    the information communication device is a camera;
    the external device is an electronic flash unit;
    if a mode of the camera is set to a rear curtain sync mode in which the electronic flash unit is caused to emit light directly before a travel of a rear curtain of the shutter, the packet generation unit generates a light emission command packet that specifies a first light emission command without including the set of data; and
    the transmission control unit causes the transmitting unit to transmit the light emission command packet, before the travel of the rear curtain of the shutter.

8. An information communication device according to claim 1, wherein:
the external device is an electronic flash unit; and
the transmission control unit changes a packet transmission start timing, according to the light emission mode in which the electronic flash unit is caused to perform emission of light.

9. An information communication device according to claim 4, wherein
the packet generation unit generates the packet that includes check data, after the command data and before the set of data, for checking data included in the packet.

10. An information communication device according to claim 1, wherein:
the information communication device is a camera;
the external device is an electronic flash unit;
the start timing of the processing related to photography is a timing at which the camera starts photometry, and a timing of a start of a preliminary emission of light that the electronic flash unit performs before a main emission of light; and
there is further provided a processing execution unit that starts photometry at the start timing of the processing related to photography.

11. An information communication device according to claim 1, wherein:
the information communication device is a camera;
the external device is an external camera that is connected by wireless to the camera;
a timing of processing related to photography is a timing at which a shutter of the camera is opened, and a timing at which a shutter of the external camera is opened; and
there is further provided a processing execution unit that opens the shutter at the start timing of the processing related to photography.

12. An information communication device according to claim 1, wherein
if a plurality of the external devices are present, the packet generation unit generates the packet including, before the set of data, information for specifying any one of the external devices individually, or information for specifying all of the external devices together.

13. An information communication device according to claim 1, wherein
if a plurality of the external devices are present, the packet generation unit generates the packet including, before the set of data, control information for controlling each of the external devices individually within the packet.

14. An information communication device according to claim 1, wherein:
the external device is an electronic flash unit; and
there is further provided a request unit that requests the electronic flash unit to transmit a packet including information that specifies a state of affairs during light emission.

15. An information communication device according to claim 14, wherein
the information that specifies the state of affairs during light emission is at least one of information that specifies that the electronic flash unit has performed full light emission, and information related to a difference between a target amount of light during light emission and an actual amount of light emitted.

16. An external device that is connected by wireless to an information communication device including a packet generation unit that generates a packet including a plurality of sets of data containing a set of data constituted with repetition of a predetermined data pattern at an end of the packet, the set of data at the end of the packet specifying to the external device a start timing for processing related to photography, a transmitting unit that transmits the packet to the external device by wireless communication, and a transmission control unit that changes a state of transmission of the set of data at the end of the packet by the transmitting unit according to the start timing of the processing related to photography, comprising:
a reception unit that receives the packet;
a detection unit that detects that the state of transmission of the set of data has changed; and
a processing execution unit that starts the processing related to photography, when a fact that the state of transmission of the set of data has changed has been detected.

17. An external device according to claim 16, wherein
the detection unit detects that the state of transmission of the set of data has changed, when it has detected that a transmission of the set of data has been stopped.

18. An external device according to claim 16, wherein
the detection unit detects that the state of transmission of the set of data has changed, when it has detected that the predetermined data pattern of the set of data has changed.

19. An external device according to claim 16, wherein:
in the packet, command data for commanding an execution of the processing related to photography is included before the set of data; and
the processing execution unit starts processing according to the command data.

20. An external device according to claim 19, wherein:
the external device is an electronic flash unit; and
the command data is data for commanding the electronic flash unit to perform light emission.

21. An external device according to claim 20, wherein:
the information communication device is a camera; and
in the packet there is included, before the set of data, data that specifies a time period over which a shutter of the camera is fully opened.

22. An external device according to claim 19, wherein
in the packet, there is included check data, after the command data and before the set of data, for checking data included in the packet.

23. An external device according to claim 16, wherein:
the information communication device is a camera;
the external device is an electronic flash unit;
the start timing of the processing related to photography is a timing at which the camera starts photometry, and a timing of a start of a preliminary emission of light that the electronic flash unit performs before a main emission of light; and
the processing execution unit starts the preliminary light emission at the start timing of the processing related to photography.

24. An external device according to claim 16, wherein:
the information communication device is a camera;
the external device is an external camera that is connected by wireless to the camera;
a timing of the processing related to photography is a timing at which a shutter of the camera is opened, and a timing at which a shutter of the external camera is opened; and
the processing execution unit opens the shutter at the start timing of the processing related to photography.

25. An external device according to claim 16, wherein:
the external device is an electronic flash unit; and there is further provided a transmission unit that, according to a request from the camera, transmits to the camera a packet including information that specifies a state of affairs during light emission.

26. An external device according to claim 25, wherein the information that specifies the state of affairs during light emission is at least one of information that specifies that the electronic flash unit has performed full light emission, and information related to a difference between a target amount of light during light emission and an actual amount of light emitted.

27. An information communication device according to claim 1, further comprising:
a detachable wireless communication unit for performing wireless communication with the external device, including at least the transmitting unit.

28. An external device according to claim 16, further comprising:
a detachable wireless communication unit for performing wireless communication with the information communication device, including at least the reception unit.

* * * * *